United States Patent [19]

Thornborough et al.

[11] Patent Number: 4,866,761
[45] Date of Patent: Sep. 12, 1989

[54] AUTOMATIC METER READING SYSTEM

[75] Inventors: Raymond J. Thornborough, Menomonee Falls; Walter L. Probert, Shorewood; Dennis L. Wachs, West Bend; Donald H. Strobel, Cedarburg; William L. Kidder, Milwaukee, all of Wis.

[73] Assignee: Badger Meter, Inc., Milwaukee, Wis.

[21] Appl. No.: 109,446

[22] PCT Filed: Jun. 19, 1987

[86] PCT No.: PCT/US87/01509
§ 371 Date: Jun. 19, 1987
§ 102(e) Date: Jun. 19, 1987

[87] PCT Pub. No.: WO87/07993
PCT Pub. Date: Dec. 30, 1987

Related U.S. Application Data

[63] Continuation-in-part of Ser. No. 876,896, Jun. 20, 1986, Pat. No. 4,817,131.

[51] Int. Cl.⁴ .......................................... H04M 11/00
[52] U.S. Cl. .................................................... 379/107
[58] Field of Search .................... 379/106, 107, 45, 47, 379/49, 50, 92; 340/870.02, 870.03, 870.06, 870.07; 364/200, 900, 483

[56] References Cited

U.S. PATENT DOCUMENTS

| | | | |
|---|---|---|---|
| 3,551,597 | 12/1970 | Russell | 379/107 |
| 3,742,142 | 6/1973 | Martin | 379/107 |
| 3,842,206 | 10/1974 | Barsellotti et al. | 379/107 |
| 3,868,640 | 2/1975 | Binnie et al. | 379/107 X |
| 4,241,237 | 12/1980 | Paraskevakus et al. | 379/107 X |
| 4,394,540 | 7/1983 | Willis et al. | 379/107 X |
| 4,495,596 | 1/1985 | Sciulli | 379/107 X |
| 4,549,044 | 10/1985 | Durham | 379/106 X |
| 4,573,115 | 2/1986 | Halgrimson . | |
| 4,639,728 | 1/1987 | Swanson | 379/107 X |
| 4,644,103 | 2/1987 | Rosenfeld . | |
| 4,649,538 | 3/1987 | DeLuca et al. . | |
| 4,654,869 | 3/1987 | Smith et al. | 379/107 |
| 4,691,344 | 9/1987 | Brown et al. | 379/106 |

OTHER PUBLICATIONS

Schiesl, J. W., "Automatic Hydrologic Observing System", U.S. Dept. of Commerce, National Weather Service, Silver Spring, MD, Jul. 1976.

*Primary Examiner*—Keith E. George
*Attorney, Agent, or Firm*—Neuman, Williams, Anderson & Olson

[57] ABSTRACT

Automatic meter readers are arranged for connection to customers' telephone lines and for automatic dialing for transmission of meter data to a computer of a utility control center, communications being effected through a call collection module which includes a plurality of call collection units connected to separate telephone lines for handling of a large number of calls. Each meter reader is battery-operated and includes a microprocessor which is powered up periodically for a short time interval to store data, to determine whether the number of power-ups since the last meter data transmission is such that a call to the utility control center should be instituted, and to determine whether leakage, tamper or other conditions require an immediate call. An operator at the utility control center can control and receive data from a very large number of meter readers and readily obtain, display and print out a variety of types of data including cumulative consumption, peak rate and time-of-day data and data with respect to leakage conditions and tampering with a reader.

6 Claims, 28 Drawing Sheets

Microfiche Appendix Included
(7 Microfiche, 686 Pages)

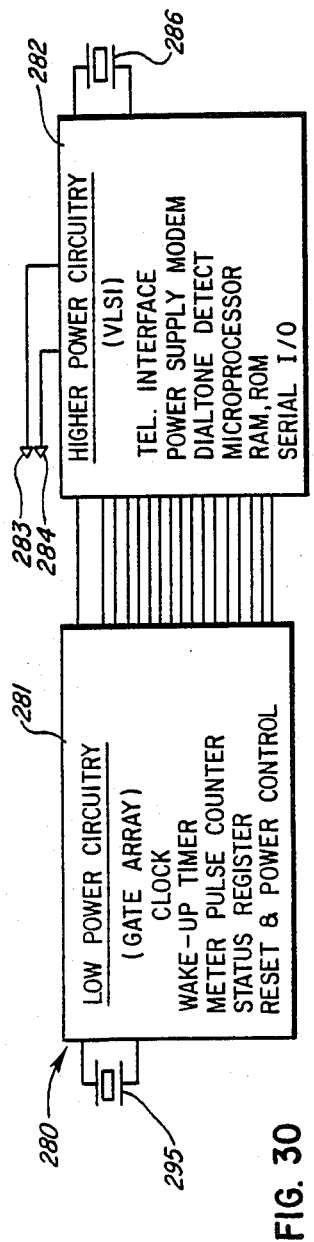
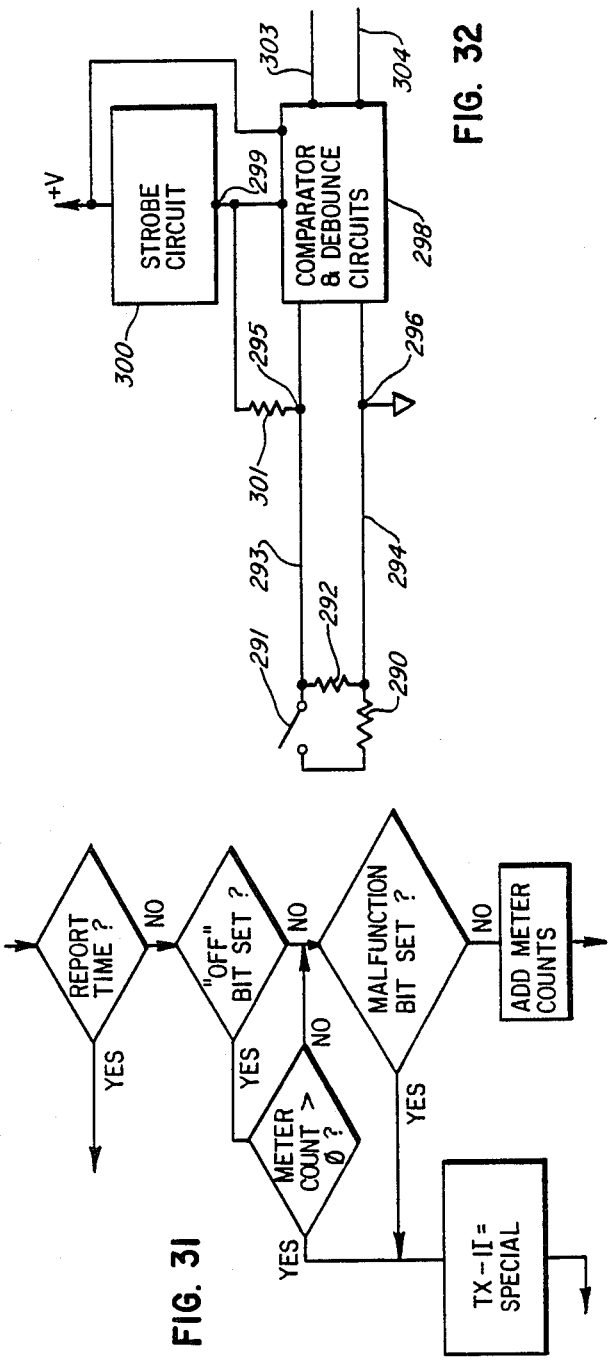

AUTOMATIC METER READING SYSTEM

The priority of prior copending national application, U.S. application Ser. No. 876,896, filed June 20, 1986 now U.S. Pat. No. 4,817,131, is claimed, this application being a continuation-in-part thereof. The disclosure of said prior application is incorporated by reference.

REFERENCE TO MICROFICHE APPENDIX

This specification includes a microfiche Appendix consisting of 7 microfiche having a total of 628 frames.

This invention relates to a meter reading system and more particularly to a meter reading system which uses customer telephone lines without requiring special equipment in a telephone exchange or at a customer's facility and which operates with minimal interference with or annoyance of customers. The system produces accurate data as to the readings of water, gas and electric meters or the like, including peak rate and time-of-day data and it is easily programmable and controllable to facilitate installation and to obtain and store, display and print-out meter data and various analyses of meter data. Operators at a central location can handle a great many readers, on the order of several tens of thousands or more, and the system is highly reliable, efficient and economical. The effective cost per customer per month for equipment, installation, servicing and telephone line usage is minimized.

BACKGROUND OF THE INVENTION

There are a great many prior art proposals for using telephone lines for automatic reporting of meter and status data as well as for control of clocks and the time of telephone calls and the reporting of alarm conditions and other remote metering and control applications. In many of the proposals for using telephone lines, an interrogation signal is sent from a receiving station to a reporting station to initiate the sending of a report, the receiving station being either at a telephone exchange or being connected through a telephone line thereto. Such systems may involve ringing of the customer's telephone or the installation of special ring-suppress equipment at the customer's facility or, alternatively, special equipment at the telephone exchange.

In another type of system, a reporting station initiates the making of a report. For example, the Stonor U.S. Pat. No. 3,098,123 discloses a system in which a pulse-dialing operation is automatically performed, followed by the sending of a message to report the condition at the reporting station. The Diaz U.S. Pat. No. 3,357,011 discloses a system in which the call-in time is controlled by a clock at the reporting station, the clock being also usable to trigger periodically transfers of data to a local memory for later transmission to the receiving station upon command.

In addition to the Diaz patent, there are other systems in which calls are made periodically or at preset times, including the Breen U.S. Pat. No. 3,046,339, the Jackson U.S. Pat. No. 3,294,910, the Klein U.S. Pat. No. 3,510,591, the Lindstrom U.S. Pat. No. 4,056,684, the Bocchi U.S. Pat. No. 4,086,434 and the Martin et al U.S. Pat. No. 4,104,486. In the Klein system, call time data are sent to a station to be stored in a memory and to be compared with clock signals to make a call-back at a desired time. The Vittoz U.S. Pat. No. 4,020,628 and the Emile, Jr. U.S. Pat. No. 4,125,993 illustrate systems in which signals may be transmitted through a telephone line to regulate the frequency or set the time at a remote clock or watch.

The National Weather Service of the National Oceanic Atmospheric Administration of the U.S. Department of Commerce has been a leader in the development of automated systems using telephone lines for the reporting of meter data. In a paper entitled: "AUTOMATIC HYDROLOGIC OBSERVING SYSTEM" by J. W. Schiesl, presented at the International Seminar on organization and operation of hydrological services, Ottawa, Canada, July 15, 1976, an "AHOS" system is described in which an Automatic Data Acquisition System (ADAS) includes a computer which operates on a standard interrogation cycle to collect data. Periodically, once every six hours, the ADAS transmits the data to a receiving station or user such as a River Forecast Center or a Weather Service Forecast Office. The system is such that a user may have the capability to request a special interrogation cycle which can be at optional intervals other than the standard cycles and to request the type of data to be reported when the ADAS reports in at the special requested time.

The computer and microprocessor technology, of course, developed very rapidly and since about the mid 1970's, microprocessors have been commercially available at relatively low cost to perform many complex functions. In addition, restrictions on the connection of equipment to telephone lines were removed in about the first half of the decade of the 1970's.

However, there has been no extensive use of telephone lines for automatic reading of water, gas and electric meters or the like. Those systems which have been used have been quite complicated and expensive and their use has been limited to special applications such as the monitoring of the meters of large industrial users of electricity or the performance of surveys on a random basis.

SUMMARY OF THE INVENTION

This invention was evolved with the general object of providing a practical, economical, efficient and reliable system for automatically obtaining accurate readings and other data from water, gas or electric meters or the like, readily installed and operable with minimal interference or annoyance of customers.

A specific object of the invention is to provide a system which is very efficient in the use of telephone lines and in which a single meter data receiving line or a small number of lines can be used to reliably and economically obtain data sent from a large number of customers without requiring special telephone equipment at a customer's facility or in a telephone exchange.

Another specific object of the invention is to provide a versatile system in which a utility or municipality may readily select types of data to be obtained and the calendar days, days of week and/or times of day when data is obtained as well as select the types of data and the format of storage, display or printing of data and analyses thereof.

A further object of the invention is to provide a system in which alarm indications are produced in response to conditions which indicate an improper operation or malfunction of metering equipment and/or to conditions which are potentially destructive or unsafe.

Another specific object of the invention is to provide a system in which metering units are powered by batteries and in which current consumption is minimized to obtain a long battery life so as to increase reliability and minimize maintenance expenses.

Important aspects of the invention relate to the recognition of the limitations and deficiencies of prior art proposals while taking into account the important real needs of utilities and municipalities and their customers with respect to meter reading operations. The invention also takes into account the performance characteristics and costs of components which are available for processing of data and transmission of data over telephone lines. It provides a system which is very efficient and economical with respect to costs of equipment, installation of equipment and operating and maintenance costs as well as the cost of telephone lines while performing extremely well and being very versatile with respect to satisfying needs.

In a system constructed in accordance with this invention, a large number of automatic meter readers (AMRs) are connected to customers' telephone lines. Each AMR is arranged to call a utility telephone number at a certain time, e.g., at 1:12:20 AM on the 9th day of each month, to send meter data through telephone exchange equipment to a call collection module (CCM) having a memory for temporary storage of such meter data. The CCM may immediately send control data back to the AMR including, for example, call-back time data and data which controls time-of-day (TOD) and peak rate (PR) metering.

The CCM is arranged for bi-directional communication with a utility control center (UCC) which includes a computer with a keyboard, display and one or more disc drives and which is connected to a printer, other peripherals or a network. An operator of the UCC may enter control data of a "global" nature, appropriate for all AMRs and may also enter control data specifically applicable to an AMR as well as the customer's name and address and other identification or status data desired by a utility. Control data entered by the operator or generated by the UCC is sent to the CCM to be processed by the CCM and sent to an AMR for control thereof.

The system of the invention is thus similar to the aforementioned National Weather Service Systems but differs therefrom in that it has the CCM as an instrumentality which acts as a buffer and as an intermediate processor with respect to transmission of control data between the control data entry point at the UCC and an AMR. It also acts as a buffer and as an intermediate processor with respect to transmission of meter data between the AMR and the data storage, display and printing equipment of the UCC.

The provision of the CCM with its buffering and processing capabilities makes it possible to reduce the processing to be performed at the AMR and to use simpler reporting and processing components in the AMR. It thereby reduces the unit cost of manufacture of the AMR which is very important in a system which has a very large number of AMRs. In addition, it permits a great deal of flexibility and versatility with respect to the meter data which is reported and with respect to the mode of reporting thereof.

Another important feature is that the CCM may be equipped to simultaneously receive and handle calls on a plurality of telephone lines and to take advantage of a roll-over feature in which only one number is assigned to all lines and in which, if one or more lines are "busy", the call is directed by the exchange to the first non-busy line of the group. This feature increases the reliability of the system, minimizing the possible blocking of a call from one AMR when a call from another is being processed. It is particularly advantageous when using WATS type lines which are economical to use when a large number of cells are received over one line and which have the advantage of avoiding any toll charges on the customer's line.

Many important features of the invention relate to the operation of the UCC. It is programmed in a manner such that control data are readily entered with a number of operations being automated to permit a very large number of AMRs to be operated from one station. For example, in developing control data for the AMR of a new customer, the program will, if desired, automatically set a date and time for call-in by the unit, a number of options being available. The UCC is also programmed to facilitate control of the days and daily time periods or "windows" in which time-of-day and peak rate accumulations are performed and it has many features relating to displaying and printing data which relate to various aspects of reported data and various aspects of the control data used in operation of the system. The UCC is also designed to facilitate an installation transaction in which a telephone call may be made to a customer to send control data for initialization of the customer's AMR.

Additional important features of the invention relate to the construction and operation of the AMRs which are battery-operated and which have components and circuitry such as to reduce the average power supplied by the battery. In one embodiment of a AMR constructed in accordance with the invention, circuitry is provided to use power from the telephone line when the unit is dialing or in an off-hook condition. In this embodiment, the AMR may go off-hook in response each call on the line, to effect a checking operation to determine whether a "demand" call is being made from the utility, which may be made for the purpose of effecting an installation transaction or to obtain data from the AMR. In each such checking operation, the modem and other circuits are energized and over a period of time considerable energy is expended and it is desirable to obtain such energy from the telephone line, rather than from batteries.

In another AMR embodiment, a demand signal detector circuit is provided which is operative to detect a demand signal of a certain form on the telephone line, such as a tone burst having a certain frequency and duration. In this embodiment, a modem needed not be energized in response to each call on the line, but only in response to an actual demand call from the utility or when making scheduled reports at monthly or other intervals. As a result, the modem may be battery operated and it is not necessary to draw power from the line to obtain a long battery life. The use of demand signal detector is also advanatageous especially in combination with an isolation transformer and protection circuitry and special features for transmission of signals from the line to the detector.

Another feature relates to the use of a microprocessor, which is advantageously provided in either of the aforementioned embodiments. A specific feature is that the microprocessor is not operated continuously but is normally inactive in a low-power state. It is operated periodically for only very short time intervals and its average current consumption is very low. Other circuitry is operative at all times but with very low power consumption, being limited in use to accumulating meter pulses for relatively short time intervals and for acting to power-up the processor in response to alarm conditions or incoming telephone calls.

Another feature of the AMR units relates to the timing of periods between activation of the processor and the correlation thereof to call-back time control data to obtain accurate control of call-back times. This feature is very important in enabling the system to reliably handle a large number of AMR units per telephone line.

Another feature relates to the detection of leaks through an arrangement which requires that in a relatively long time period such as the time between monthly reports, there must be at least one time period of relatively short duration, two hours, for example, in which no flow is indicated. Otherwise, a leak indication is generated. This feature is particularly advantageous in water metering and is capable of detecting conditions which might otherwise be detected only after severe damage has occurred.

A further feature relates to the transmission to an AMR of a control signal to place it in an inactivated mode, as when service to a customer has been discontinued and when service to a new customer at the same location has not been started. If consumption occurs in the inactivated mode, the AMR operates to immediately send an alarm signal to the CCM.

Additional features relate to detection of freeze, low battery and tamper conditions and operations in response thereto. In response to physical tampering, current meter data is immediately stored in an EEPROM or non-volatile memory and then a dialing operation is initiated to report to the CCM. If dial tone is not detected, due to cutting of the line for example, the tamper report and meter data are reported when the wire is reconnected.

This invention has many other objects, features and advantages which will become more fully apparent from the following detailed description taken in conjunction with the accompanying drawings.

BRIEF DESCRIPTION OF THE DRAWINGS

FIG. 30 is a schematic block diagram illustrating a modified automatic meter reader;

FIG. 31 is a flow chart corresponding to a right-hand portion of the flow chart of FIG. 14 and showing a modified operation;

FIG. 32 is a schematic diagram showing an arrangement for detecting open or short conditions of a meter switch;

DESCRIPTION OF A PREFERRED EMBODIMENT

Figure 1:
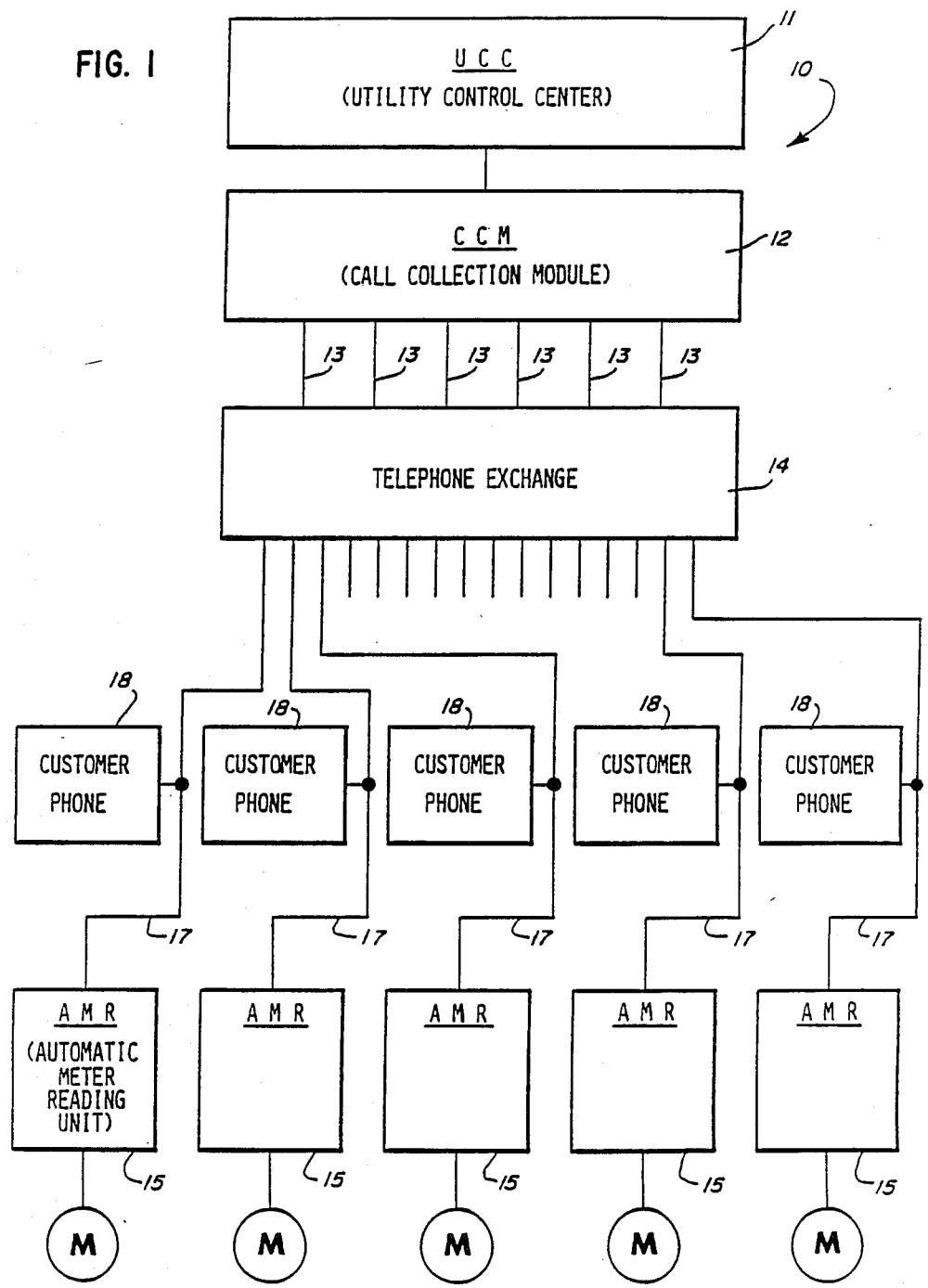
FIG. 1 is a schematic block diagram of a meter reading system constructed in accordance with the principles of this invention.

Reference numeral 10 generally designates an automatic meter reading system constructed in accordance with the principles of the invention. The system 10 comprises a central processing station or utility control center 11, hereinafter referred to as the "UCC", and at least one call collection module 12, hereinafter referred to as a "CCM". Each CCM 12 is connected through one or more telephone lines 13 to telephone exchange equipment 14, six lines being shown. The system 10 further includes a plurality of automatic meter reading units 15 connected to meters 16, which may be water, gas or electric meters at customers' residences. Each unit 15 is referred to herein as an "AMR" and is connected to the exchange equipment 14 through a telephone line 17 which may be a non-dedicated line with a customer's telephone 18 connected thereto, as shown.

The system 10 is very efficient in receiving raw meter data in the form of electrical signals developed at the meters 16, processing of such data and developing highly useful output data for use by a utility or municipality with provisions for storing data as long as required. The output data may include, for example, meter readings obtained at predetermined times, time-of-day accumulation data ("TOD"), peak rate data ("PR") and leakage, tamper and malfunction indications. The mode of operation is readily changeable or programmable from the UCC 11, and the system is such as to facilitate initial installation of AMR units, discontinuing service to one customer and starting service with another, keeping track of the operational status of all units, making analyses of operations and the rendering of reports which may be printed or transmitted. The UCC equipment includes a computer keyboard and display and its construction and operation are described in detail hereinafter.

The system 10 is also advantageous in that it so operates as to be substantially "invisible" with minimal interference with the customer's use of telephone lines and it does not require any modification of the telephone exchange equipment or of the customer lines or equipment.

In operation of the illustrated system, each AMR 15 receives and processes raw meter data, continually developing and updating TOD and PR data as well as accumulated readings. At an assigned time, typically at a certain day of the month and during a night-time period when the customer is least apt to be using the telephone, the AMR 15 goes to an off-hook condition and, if dial tone is detected, it proceeds to dial a telephone number corresponding to a line which is connected to the CCM 12. In one mode of operation, it waits for receipt of a carrier signal from the CCM 12. In another, it waits for the expiration of a certain delay time. In either case, the AMR 15 then proceeds to apply signals to the telephone line 17, in an attempt to send data to the CCM 12, including identification and security data and status data as well as the processed meter data.

The CCM 12 stores received data and processes it, making a security check and making a determination of new data to be sent to the AMR 15. Such new data are preceded by an acknowledgment character and may include security data and the time for the next call-in by the AMR 15. If properly received, the AMR 15 responds with an acknowledgment character and security data. Then the CCM 12 may send another acknowledgment character and control data such as an exemption schedule for holiday days when TOD/PR data are not to be accumulated and/or data as to new "windows" or periods during each day when TOD or PR data are to be accumulated. After a final acknowledgment character from the AMR, both the AMR and CCM go to on-hook conditions.

Important features of the invention relate to the operation of the CCM 12 and particularly with respect to handling calls from a large number of the AMR units 15. By way of example, one CCM may handle calls from on the order of 60,000 AMR units each month on each line connected thereto. Such calls may be made during night-time hours when there will be minimal interference with use of customer telephones and when the loading of the telephone exchange is at a minimum. As a result, the time available for each call may be on the order of 20 seconds or less. In these circumstances, it is highly desirable that the time of each call-in be minimized to reduce the possible rejection of a call when two or more AMR units call in at about the same time. Also, of course, reducing the call-in time is desirable since it reduces telephone line charges.

As described in detail hereinafter, the CCM 12 stores control data which may include a telephone number of the CCM 12 and other data which might be classed as "global" data applicable to all AMR units and it also stores data corresponding to each individual AMR 15 such as its serial number and data as to the day of the week, month or quarter in which it is to report. Such control data can be changed from the UCC 11. However, at the time of call-in from any AMR 15, the CCM 12 is in a condition to quickly determine, from data stored in its memory, the control data to be sent to the AMR 15 which has initiated the call. Thus no communications with the UCC are required in handling a routine scheduled report from an AMR and the time required for handling each scheduled report is minimized.

Another feature of the CCM 12 is that it is equipped to simultaneously receive and handle calls on a plurality of telephone lines, the illustrated CCM being connected to six lines. With this feature, it is possible to take advantage of a "roll-over" operation which is available in most if not all telephone exchanges, in which only one telephone number is assigned to a group of lines and in which if one or more lines of the group are "busy" when a call is made to the assigned number, the call is directed by the exchange to the first non-busy line of the group. The ability to simultaneously process multiple calls is very important in avoiding the possible blocking of a call from one AMR 15 when a call from another AMR 15 is being handled or when a call is accidentally or maliciously made to the assigned number by a source other than an AMR 15.

These and other features of the CCM 12, as well as associated features of the UCC 11 and the cooperation of the UCC 11 and the CCM 12, are described in detail hereinafter.

AMR UNITS 15

Figure 2:
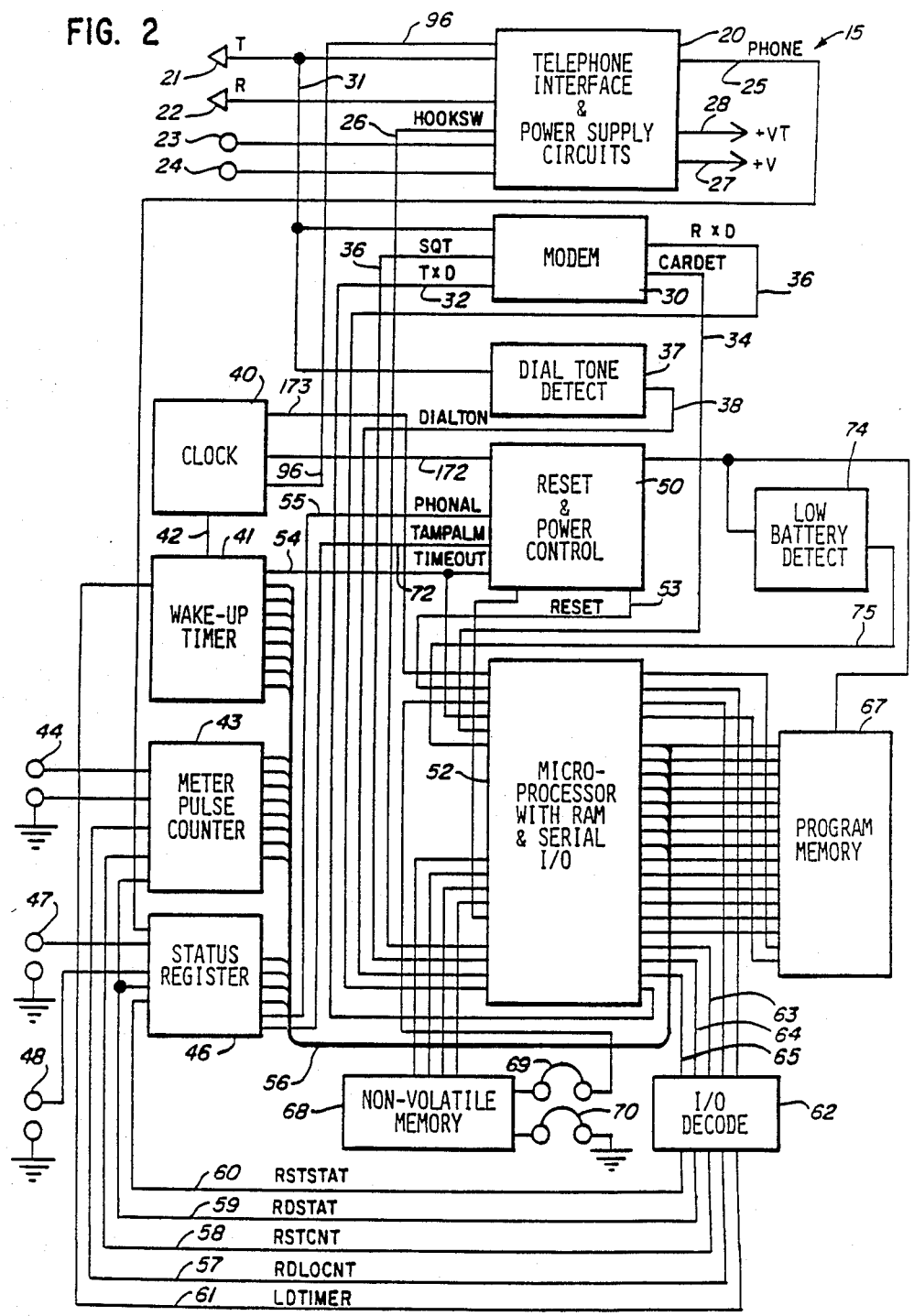
FIG. 2 is a schematic block diagram of an automatic meter reader of of the system of FIG. 1.

FIG. 2 is a schematic block diagram of one of the automatic meter reading units 15. Each unit 15 includes telephone interface and power supply circuitry 20, connected to "tip" and "ring" telephone line terminals 21 and 22 and connected to battery terminals 23 and 24. Circuitry 20 operates to develop a signal on a "PHONE" line 25 when a ring signal is detected on the telephone line and it includes a solid state hook switch operable to an off-hook condition in response to a signal applied thereto on a "HOOKSW" line 26. It also develops "+V" and "+VT" voltages on lines 27 and 28 which supply operating voltages to various circuits of the AMR 15. The +VT voltage on line 28 is developed from the telephone line voltage in the off-hook condition and is applied directly to circuits which are operative in the off-hook condition. The +V voltage on line 27 is applied to other circuits and is developed through a regulator from the battery voltage in the on-hook condition and from the +VT voltage in the off-hook condition, battery current being minimized. These and other features of the interface and power supply circuitry 20 are described in detail hereinafter in connection with FIG. 3.

A modem circuit 30 is provided having an input connected through a line 31 to the tip terminal 21. When operative as a modulator, the circuit 30 responds to digital signals applied on a "TXD" line 32 to send frequency shift modulated signals out on the telephone line. When operative as a demodulator, it detects the existence of a carrier signal on the telephone line to develop a signal on a "CARDET" line 34 and in response to a frequency shift modulated signal on the telephone line, it develops a corresponding digital signal on a "RXD" line 35. A disabling "squelch" signal is applied thereto at certain times, through a "SQT" line 36.

The AMR 15 also includes a dial tone detect circuit 37 which responds to a dial tone signal on line 31 to develop a signal on a "DIALTON" line 38. Circuit 37 as well as the modem circuit 30 are energized only in the off-hook condition from the +VT line 27 and do not draw battery current.

Additional circuits of the AMR 15 are provided for registering meter pulses and monitoring conditions and are energized at all times, normally from the battery, such circuits have very low current consumption. These include a clock circuit 40; a wake-up timer circuit 41 which responds to clock pulses applied thereto through a line 42; a meter pulse counter 43 which responds to meter pulses applied from a meter terminal 44; a status register circuit 46 which has inputs connected to the "PHONE" line 25 and to terminals 47 and 48 which are connected to switches for detection of tamper and freeze conditions; and a reset and power control circuit 50. A random access memory portion of a micro-processor 52 is also energized at all times, in both a "sleep" condition and a power-up or active condition. However, other circuits, including the main processing circuitry of the microprocessor 52 and serial input-output circuitry associated therewith, are operative only in the power-up condition which is established periodically for short intervals to store accumulated data, or to make a scheduled report or in response to incoming calls or tamper conditions.

Ordinarily, in the absence of a tamper alarm and except when a scheduled report is due, the microprocessor 52 is operated to the power-up condition periodically, e.g., every 5 minutes, in response to a signal applied through a "RESET" line 53 and developed by the reset and power control circuit 52 in response to a signal applied through a "TIMEOUT" line 54 from the wake-up time 41. The microprocessor 52 then increments a 5 minute interval register, adds the meter count from the preceding 5 minutes to a total count register, adds counts to or updates time-of-day and peak rate registers, as appropriate, and then returns to the sleep condition.

When a scheduled report is due, the microprocessor 52 initiates an operation in which a signal is applied through the "HOOKSW" line 26 to the circuitry 20 to establish an off-hook condition and to then wait for a signal on the "DIALTON" line 38. Then a pulse-dialing operation is performed, through signals on the "HOOKSW" line 26, to dial the number of the CCM 12 and the microprocessor 52 then waits for a signal on the "CARDET" line 34. Then the microprocessor 52 applies a squelch signal to the modem 30 through the "SQT" line 36 and it then proceeds to apply signals through the "TXD" line 32 to the modem 30, to cause the modem 30 to send FSK modulated signals to the CCM 12 and thereby send data thereto. Then the microprocessor 52 monitors the "RXD" line 35 from the modem 30, for receipt of an acknowledgment character and data from the CCM 12. After data is sent back and forth in this way to effect a complete scheduled report transaction, the microprocessor 52 operates to set the wake-up timer 41, makes a final phone/tamper check and then returns to the sleep condition.

The scheduled report transaction is set forth in more detail hereinafter, along with other transactions which include an installation transaction performed when initially installing an AMR 15; a demand reading transaction which may be initiated by a request or demand call from the CCM to the AMR, as when stopping service to a customer who is moving or when starting service to a new customer at the same location; an emergency report transaction initiated in response to a tamper or other alarm condition; and a "brainwash" transaction usable through a call from the CCM to place an AMR 15 in a pre-installation condition.

Whenever any call is made to the customer's line, a signal is developed on the line 25 and is applied to the status register circuit 46 which, in turn, applies a signal through a "PHONAL" line 55 to the reset and power control circuit 50. The microprocessor 52 is then activated to determine whether the call came from the CCM 12 and, if so, to make an appropriate response, according to whether an installation transaction, a demand read transaction, or a "brainwash" transaction is indicated.

An eight line data bus 56 is provided for transmission of data between the microprocessor 52 and the wake-up timer 41, meter pulse counter 43 and status register 46. A signal is sent on a "RDLOCNT" line 57 to read the least significant 8 bits of data from the meter pulse counter 43 and a signal is sent on a "RSTCNT" line 58 to reset the meter pulse counter 43. Similarly, read and reset signals are sent to the status register through "RDSTAT" and "RSTSTAT" lines 59 and 60, the signal on line 59 being also applied to the meter pulse counter 43 being used to read the most significant 3 bits of data from the meter pulse counter 43. The wake-up timer 41 is loaded with a predetermined count by applying a signal on a "LDTIMER" line 61. The signals on lines 57–61 are developed by an input/output address decoder circuit 62 which is connected to address lines of the microprocessor 52 through lines 63–65.

A program memory 67 is connected to the data bus 56 and to address lines of the microprocessor 52 and a non-volatile but programmable EEPROM memory 68 is connected to input/output ports of the microprocessor 52. As shown, terminals of the memory 68 are connectable through jumpers 69 and 70 to ground and to a terminal of the microprocessor 52, jumpers 69 and 70 being optional and being installed for a 128×8 EEPROM and being removed for a 16×16 EEPROM.

In response to a tamper condition, the status register circuit 46 immediately sends a signal through a "TAMPAL" line 72 to the reset and power control circuit 50 which applies a reset or "wake-up" signal through line 53 to the microprocessor 52. The microprocessor 52 then operates to immediately store certain key data in the non-volatile memory 68 and also operates to attempt to make a telephone call to the CCM 12 to report the tamper condition.

The AMR further includes a low battery detector 74, the output of which is connected through a line 75 to the processor 52 monitored following time-outs of the wake-up timer 41, the low battery condition being then reported.

Telephone Interface and Power Supply Circuit 20

Figure 3:
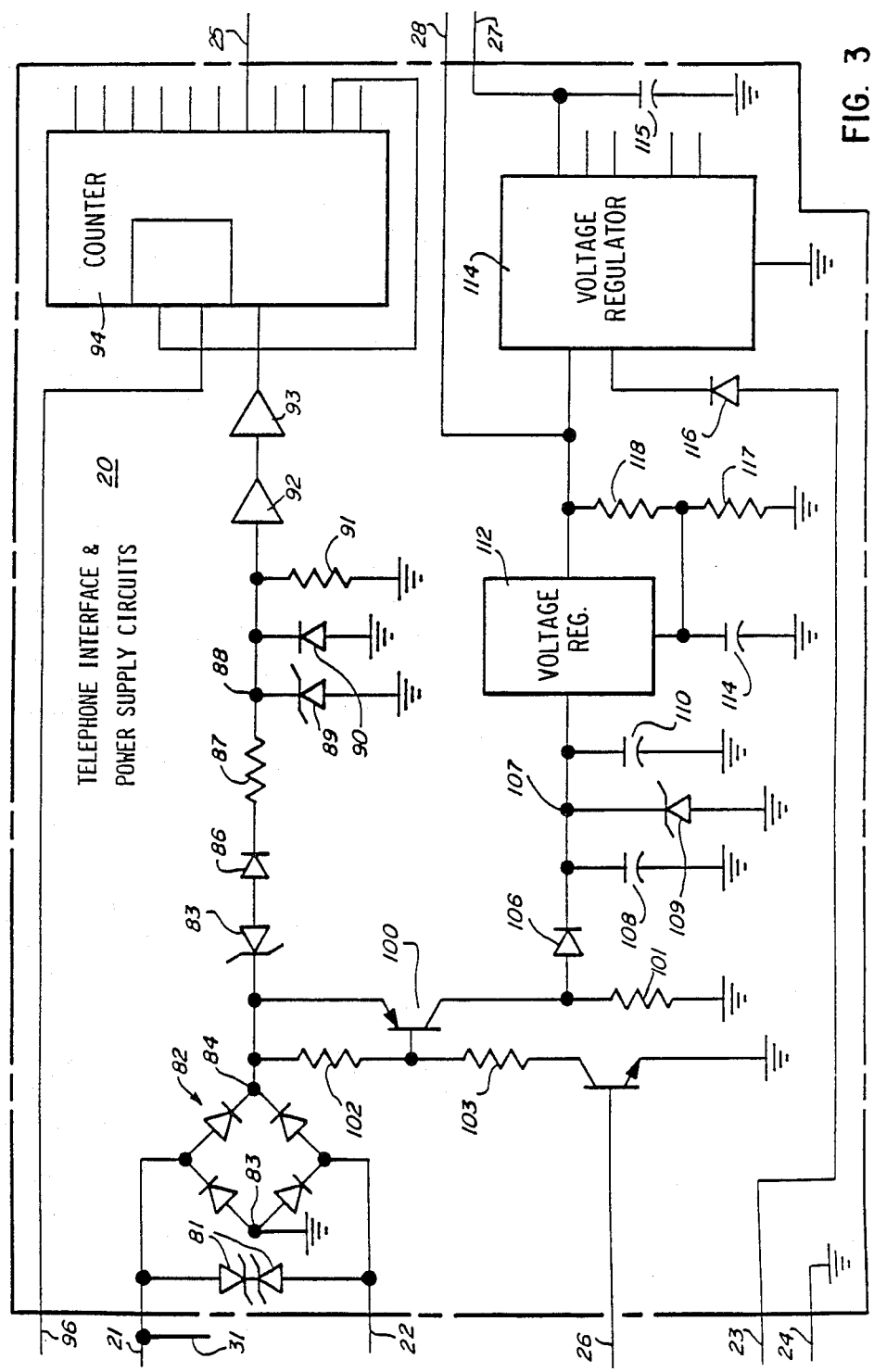
FIG. 3 is a schematic circuit diagram of telephone interface and power supply circuitry of the automatic meter reader of FIG. 2.

FIG. 3 is a circuit diagram of the telephone interface and power supply circuits 20. A pair of voltage-protection diodes 81 are connected in series between the tip and ring terminals 21 and 22 which are connected to the input of a diode bridge circuit 82 which has a grounded output terminal 83 and an ungrounded output terminal 84. Terminal 84 is connected to the input of ring detect circuitry which includes the Zener diode 85, a conventional diode 86 and a resistor 87 connected in series between terminal 84 and a circuit point 88, circuit point 88 being connected to ground through a Zener diode 89, a capacitor 90 and a resistor 91 in parallel and also being connected through two cascaded Schmitt trigger circuits 92 and 93 to a reset input of a counter 94. When an AC ring voltage is developed between the terminals 21 and 22 which has a peak value substantially greater than the limit voltage of Zener diode 85, a reset signal is applied from trigger circuit 93 to the counter 94 which then begins counting clocking pulses which are applied through a line 96. The clocking pulses may be applied at a 1 Hz rate and after a certain number of pulses (6 pulses for example), an output signal is developed on the "PHONE" line 25. After nine pulses, a signal is developed on a line 97 to inhibit clocking of the counter 94.

The output terminal 84 of the bridge rectifier 82 is also connected to the emitter of a transistor 100 having a collector connected to ground through a line loading resistor 101. The base of the transistor 100 is connected through a resistor 102 to the terminal 84 and also through a resistor 103 to the collector of a transistor 104 which has a grounded emitter and which has its base connected to the "HOOKSW" line 26. When line 26 is brought high, transistor 104 conducts to cause conduction of transistor 100 and to develop a low impedance between terminals 21 and 22 such as to establish an off-hook condition while also developing a DC voltage across the line loading resistor 101. The voltage developed across resistor 101 is applied through diode 106 to a circuit point 107 which is connected to ground through a capacitor 108, a Zener diode 109 and a second capacitor 110. Circuit point 107 is also connected to the input of a voltage regulator 112 which has an output terminal connected directly to the "+VT" line 28 and also connected to the input of a second voltage regulator 114 which has an output terminal connected to the "+V" line 27 which is connected through a filter capacitor 115 to ground. A second input of the regulator 114 is connected through a diode 116 to the battery terminal 23 and the regulator 114 operates as a selector to develop the "+V" voltage on line 27 either from the output of the regulator 112 or from the battery terminal 23, whichever is higher. By way of example, the battery voltage may be approximately 5 volts and the regulator 112 may operate to develop a voltage 5.48 volts in the off-hook condition. The output voltage of regulator 112 is controlled by a reference voltage developed by voltage-divider resistors 117 and 118, the junction between resistors 117 and 118 being connected to a reference voltage input of regulator 112 and being also connected to a filter capacitor 119 to ground.

For pulse-dialing, the transistor 100 is controlled through the transistor 104 from the "HOOKSW" line 26 and the combined capacitance of the capacitors 108 and 110 is sufficient to operate during pulse-dialing to maintain a voltage at the input of the regulator 112 which is substantially higher than the desired regulated output voltage thereof. Thus, no battery current is drawn during either the off-hook condition or during pulse-dialing.

Modem Circuit 30

Figure 4:
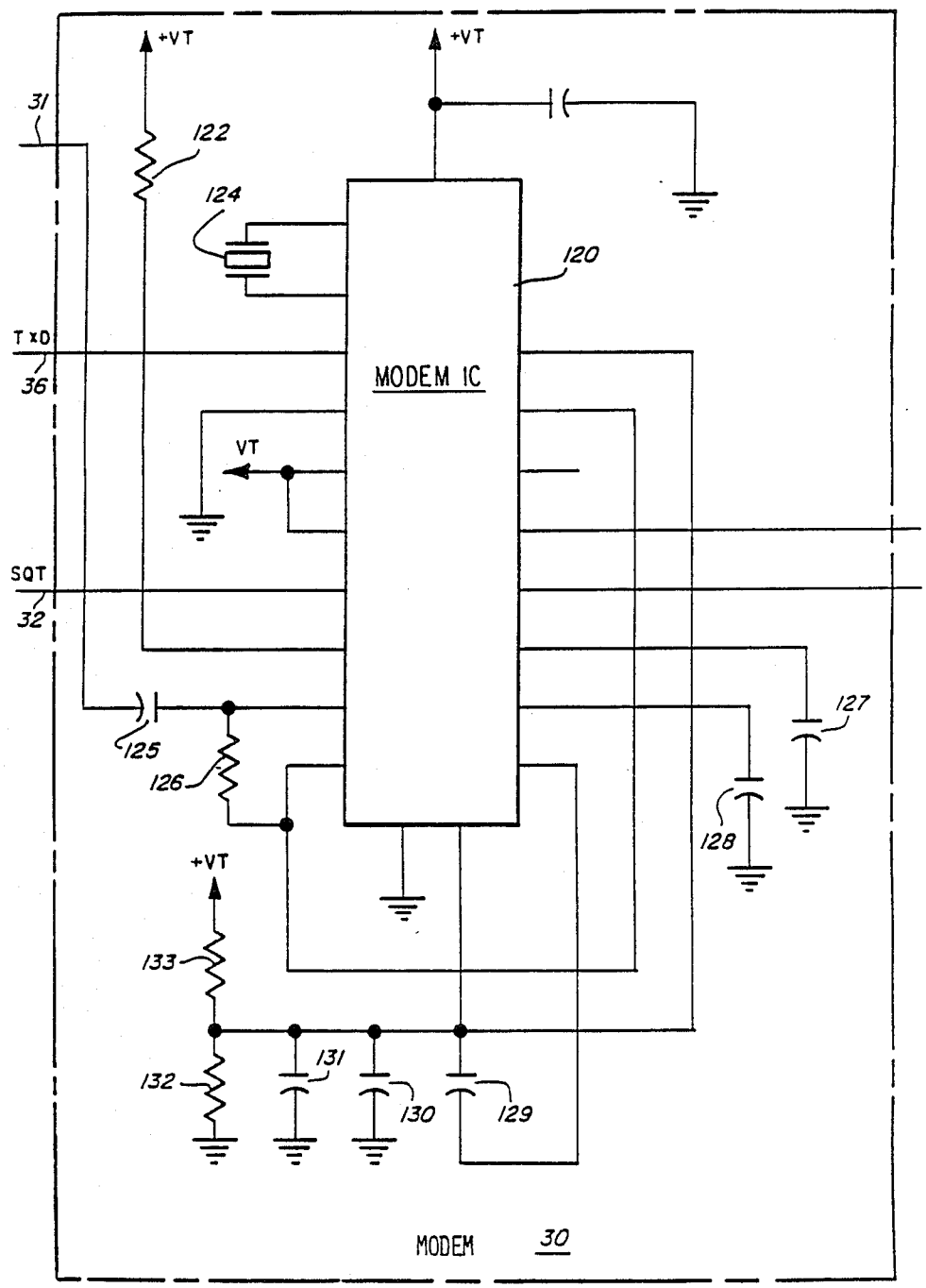
FIG. 4 is a schematic circuit diagram of modem circuitry of the automatic meter reader of FIG. 2.

The modem circuit 30 is shown in FIG. 4 and, as shown, it includes a standard integrated circuit 120 which has "TXD", "CD", "RXD" and "SQT" terminals, respectively connected to the lines 32, 34, 35 and 36. A "VCC" terminal is connected to the "+VT" line 28 and through a filter capacitor 121 to ground, the line 28 being also connected through a resistor 122 to a "TLA" terminal and also to an "ORG" terminal to set the modem at an "originate" mode. A crystal 124 is connected to the modem 120 for timing control. The line 31, which is connected to the tip terminal 21, is connected through a capacitor 125 to an "RXA" terminal which is connected through a resistor 126 to a second "RXA" terminal and to a "TXA" terminal. In addition, capacitors 127–131 and resistors 132 and 133 are provided which are connected to terminals as shown and which have values such as to obtain optimum operation especially with respect to attack/release times.

Dial Tone Detect Circuit 37

Figure 5:
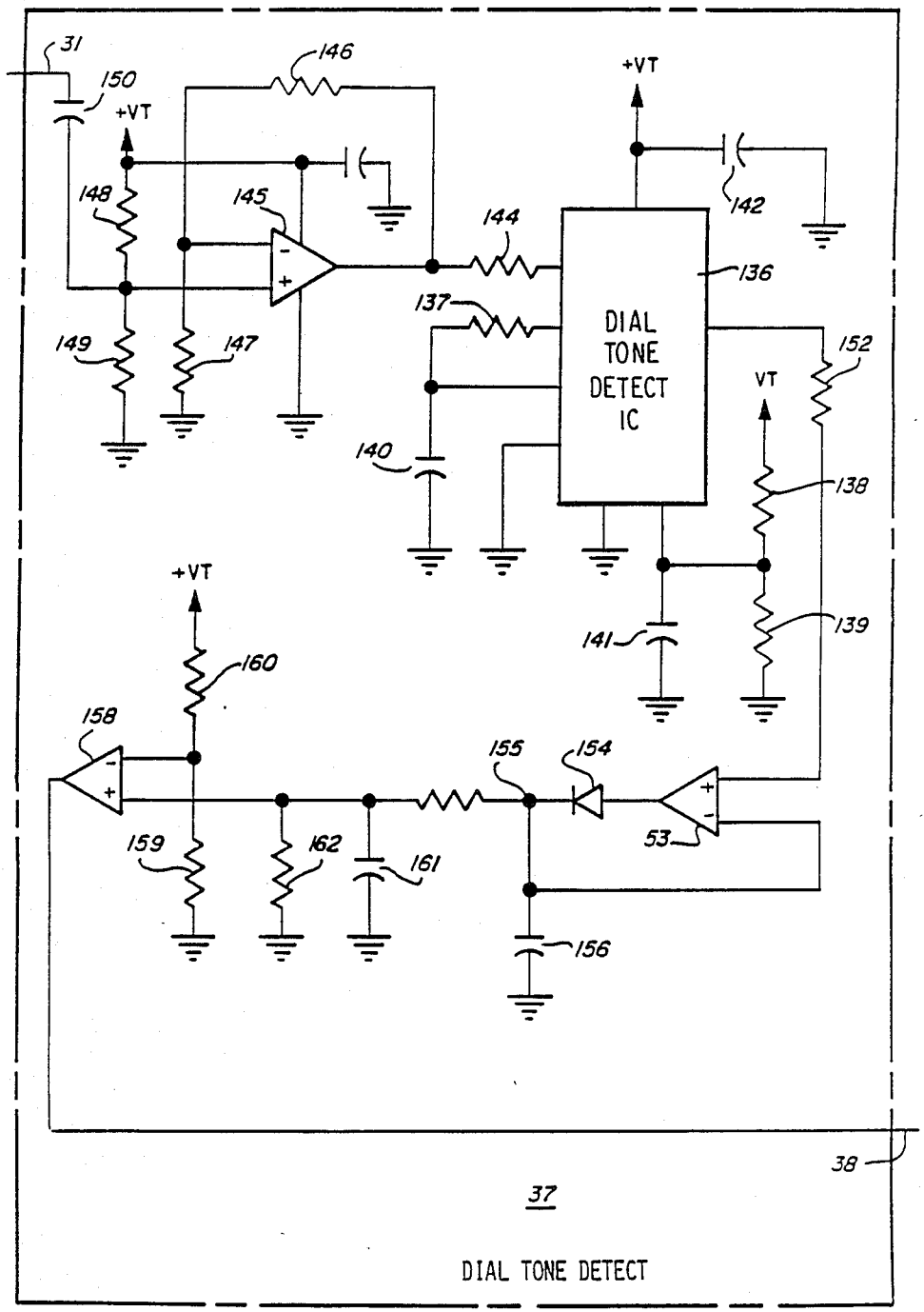
FIG. 5 is a schematic circuit diagram of dial tone detect circuitry of the automatic meter reader of FIG. 2.

FIG. 5 shows the circuitry of the dial tone detect circuit 37 which includes an integrated circuit 136 connected to resistors and capacitors to operate as a lowpass filter in detecting a dial tone signal, usually a continuous tone made by combining frequencies of 350 Hz and 440 Hz. Such resistors and capacitors include resistors 137, 138 and 139 and capacitors 140 and 141, connected as shown. A supply voltage input terminal is connected to the "+VT" line 28 which is connected to a filter capacitor 142 to ground. An input terminal of the filter 136 is connected through a resistor 144 to the output of an operational amplifier 145 which has a minus input connected through a resistor 146 to its output and through a resistor 147 to ground and which has a plus input connected through a resistor 148 to the +VT line 28 and through a resistor 149 to ground. The plus input is also connected through a coupling capacitor 150 to the line 31 which is connected to the tip phone line terminal 21.

An output terminal of the integrated circuit 136 is connected through a resistor 152 to the plus input of an operational amplifier 153 which is operable as a peak detector, the output thereof being conected through a diode 154 to a circuit point 155 which is connected to the minus input thereof and which is connected through a capacitor 156 to ground. Circuit point 155 is connected through a resistor 157 to a plus input of an operational amplifier 158 which is operable as a threshold or level detect circuit, the minus input terminal being connected to a voltage divider which is formed by resistors 159 and 160 connected between ground and the +VT line 28. A capacitor 161 and a resistor 162 are connected in parallel between the plus input of amplifier 158 and ground. When the peak amplitude of a dial tone signal exceeds a certain level, the amplifier 158 develops a signal on the "DIALTON" line 38.

Clock Circuit 40

Figure 6:
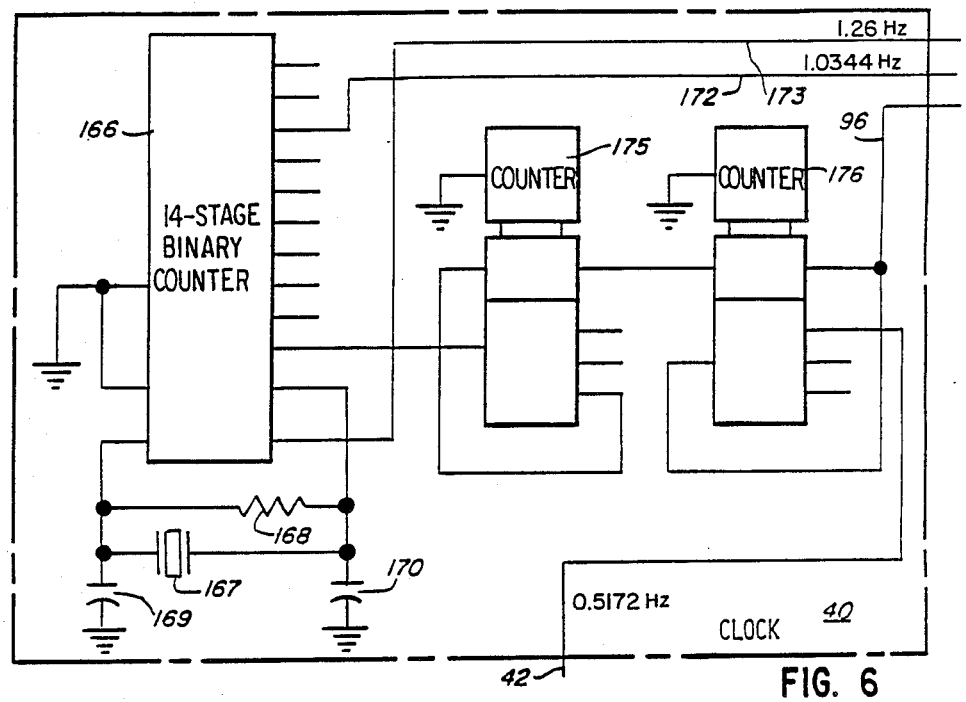
FIG. 6 is a schematic circuit diagram of clock circuitry of the automatic meter reader of FIG. 2.
Figure 7:
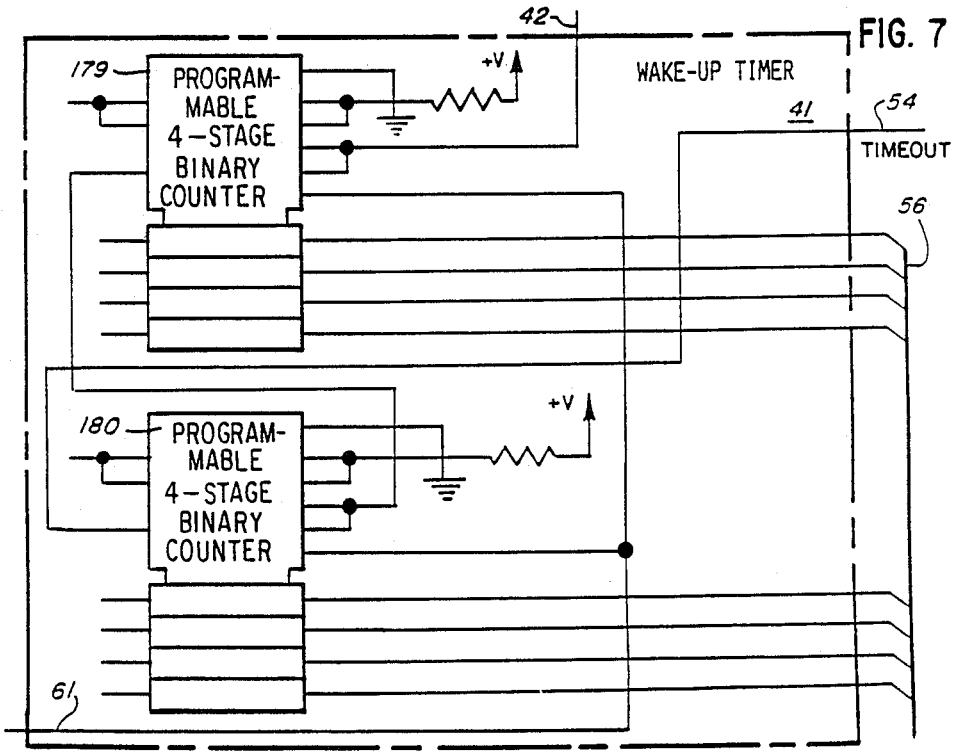
FIG. 7 is a schematic circuit diagram of wake-up timer circuitry of the automatic meter reader of FIG. 2.

The clock circuit 40, as shown in FIG. 6, comprises an integrated circuit 166 which includes a 14 stage binary divider driven by an oscillator circuit which is connected to a crystal 167, a resistor 168 being connected in parallel with the crystal 167 and a pair of capacitors 169 and 170 being connected between the terminals of crystal 167 and ground.

A divide-by-32 signal, developed at the output of a fifth stage of the counter chain in circuit 166, is applied through a line 172 to the reset and power control circuit 50 to clock a shift register thereof, as hereinafter described. A signal at the oscillator frequency, which may be 1.2672 MHz, for example, is applied through a line 173 to the microprocessor to provide the clock signal thereto. In addition, a divide-by-8192 signal is developed at the output of a thirteenth stage of the counter chain and is applied through a line 174 to the input of the first of two cascaded counters 175 and 176. Each of the counters 175 and 176 includes divide-by-2 and divide-by-5 sections, such sections being connected as shown and being operative to develop a signal on the line 42 which has a frequency of 0.5172 Hz in the illustrated embodiment. Also, a 1.0344 Hz signal is developed on line 96 for application to the telephone interface circuits.

Wake-up Timer 41

The 0.5172 Hz signal on line 42 is applied to the input of the first of two cascaded programmable four-stage binary counters 179 and 180 which are connected to the eight line data bus 56. The "TIMEOUT" line 54 is connected to the output of the second programmable counter 180 and the "LDTIMER" line 61 is connected to control inputs of both counters 179 and 180 to control loading of the counters with data on the data bus 56 and to cause development of the signal on the line 54 at a time-out time corresponding to the applied data.

Ordinarily, except when a scheduled report is due, a count of 155 is loaded into the counters from the data bus 56 and a time-out occurs after slightly less than 300 seconds at which time the microprocessor 52 is powered up to add counts to various registers and to re-load the counters 179 and 180 and then return to the sleep condition. When a scheduled report is due in the next 5 minutes, a count of less than 155 may be entered into the counters 179 and 180 and other operations are performed as hereinafter described.

Meter Pulse Counter 43

Figure 8:
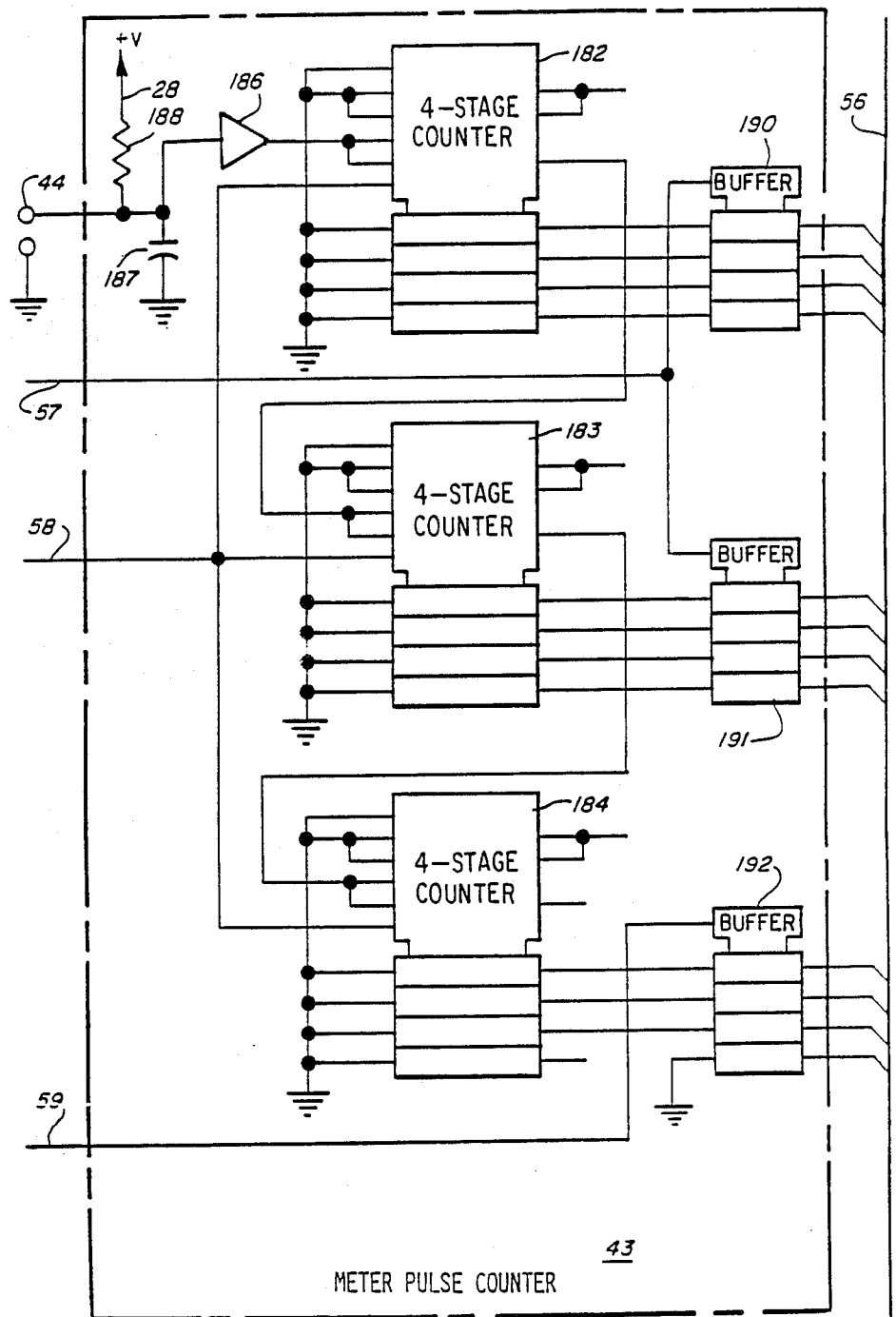
FIG. 8 is a schematic circuit diagram of meter pulse counter circuitry of the automatic meter reader of FIG. 2.

As shown in FIG. 8, the meter pulse counter 43 comprises three cascaded four-stage counters 182, 183 and 184. The input of the first counter 182 is connected to the output of a Schmitt trigger circuit 186, the input of which is connected to the meter pulse input terminal 44 and also through a capacitor 187 to ground and through a resistor 188 to the +VT line 28, filtering and debounce functions being performed. The "RSTCNT" line 58 is connected to reset inputs of all three counters 182, 183 and 184. Three four-stage buffers 190, 191 and 192 are provided between the counters 182, 183 and 184 and the data bus 56. Buffers 190 and 191 are controlled from the "RDLOCNT" line 57 and are used to read the least significant eight bits of the accumulated meter pulse count to the data bus 56. The buffer 193 is controlled from the "RDSTAT" line 59 and is used to read the three most significant bits of the accumulated meter pulse count to the data bus 56, while simultaneously reading 'phone, tamper and freeze status information to the data bus 56. It is noted that only the first three stages of the counter 184 and the first three stages of the buffer 192 are utilized in the illustrated embodiment so that there are a total of 11 stages in the meter pulse counter. A count capacity of 2048 is sufficient for the purposes for which the unit is designed.

Status Register 46

Figure 9:
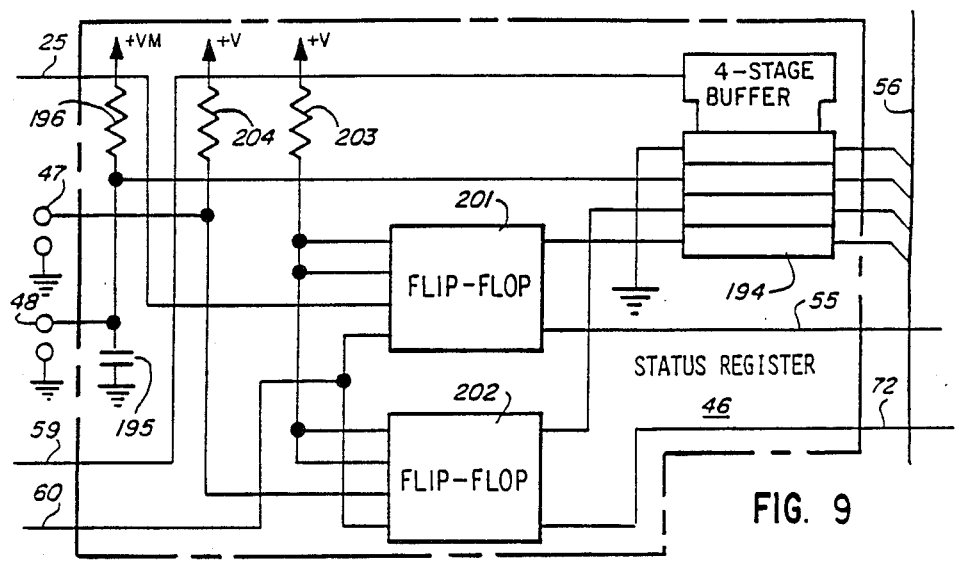
FIG. 9 is a schematic circuit diagram of status register circuitry of the automatic meter reader of FIG. 2.

As shown in FIG. 9, the status register 46 comprises a four-stage buffer 194 connected to the "RDSTAT" line 59 and to the data bus 56. Only three stages of the buffer 194 are used. One stage is connected to the terminal 48 and through a capacitor 195 to ground and through a resistor 196 to a +VM line 198 which is connected to the reset and power control circuit 50. The terminal 48 is connected to a switch of a freeze detector unit, the switch being normally closed but being opened when the temperature drops below a certain value, close to the freezing temperature. During each wake-up time, the reset and power control circuit 50 applies a voltage to the +VM line 198 to apply signal to the freeze detect stage of the buffer 194 and a read signal is then applied through the "RDSTAT" line 59.

The other two operative stages of the buffer 194 are connected to outputs of two flip-flops 201 and 202 which have set inputs connected through a resistor 203 to the +V line 27 and which have reset inputs connected to the "RSTSTA" line 60. The clock input of the flip-flop 201 is connected to the "PHONE" line 25 while the clock input of the flip-flop 202 is connected to the terminal 47 for connection to a normally open tamper switch which closed open in response to a tamper condition. Terminal 47 is connected through a resistor 204 to the +V line 27. Flip-flops 201 and 202 operate as edge triggered flip-flops to be set in response to detection of a ring signal and development of a corresponding signal on the "PHONE" line 25 or in response to a closed condition of the tamper switch. Second outputs of the flip-flops 201 and 202 are connected to the "PHONAL" line 55 and to the "TAMPALM" line 7x to immediately initiate operation of the reset and power control circuit 50 in response to an incoming telephone call or a tamper condition.

Reset and Power Control Circuit 50

Figure 10:
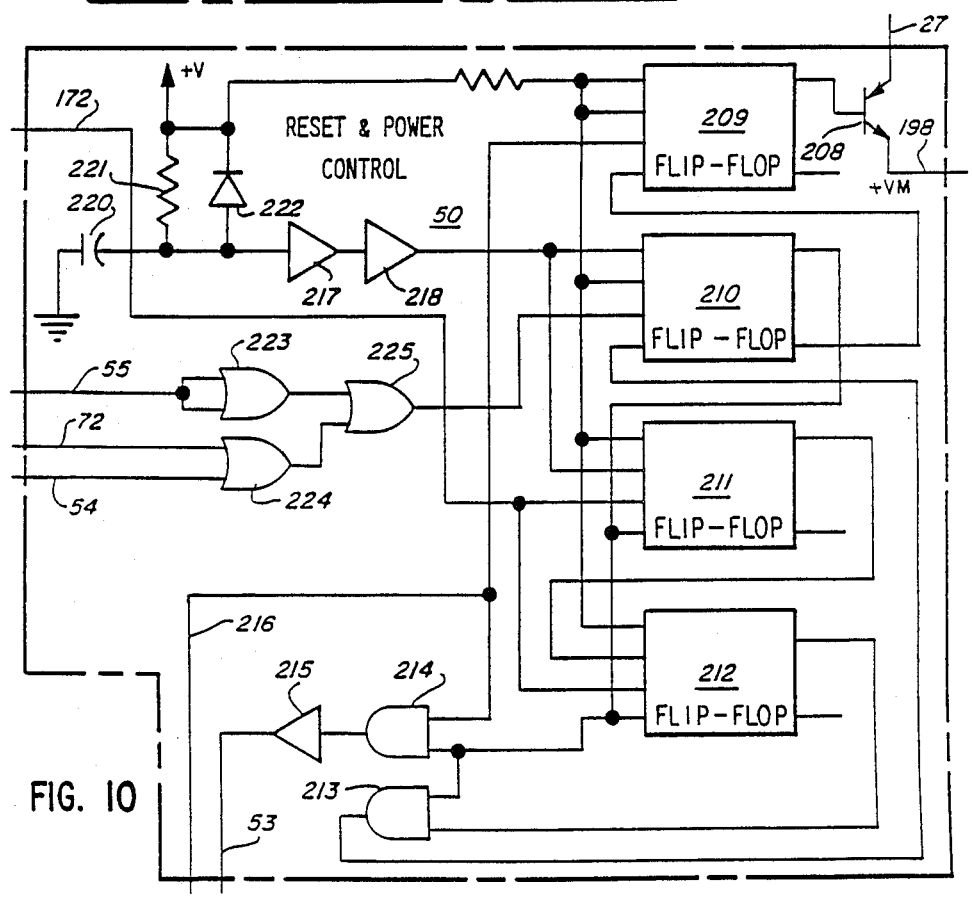
FIG. 10 is a schematic circuit diagram of reset and power control circuitry of the automatic meter reader of FIG. 2.
Figure 11:
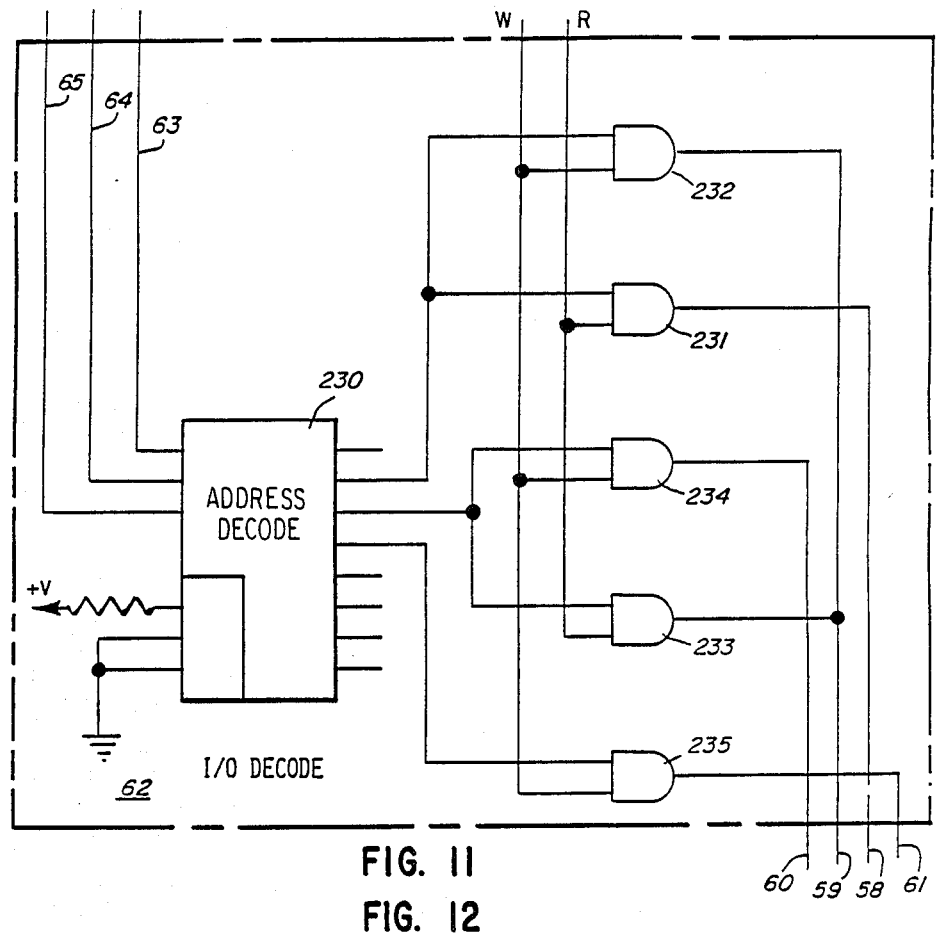
FIG. 11 is a schematic circuit diagram of input/output decode circuitry of the automatic meter reader of FIG. 2.

Referring to FIG. 10, the circuit 50 includes a transistor 208 which is controlled by a flip-flop 209 to be rendered conductive and connect the +V line 27 to the +VM line 198 and to supply operating voltage to the program memory 67 and the non-volatile memory 68 and to also supply voltages for freeze detection and low battery detection. Normally, the flip-flop 209 is in a set condition and the transistor 208 is non-conductive. Flip-flop 209 may then be reset when a flip-flop 210 is set by a "TIMEOUT" signal on line 54, a "TAMPAL" signal on line 72 or a "PHONAL" signal on line 55.

An output of the flip-flop 210 is connected to reset inputs of two cascaded flip-flops 211 and 212 having clock inputs connected through the line 172 to the output of the fifth stage of the divider chain of the clock circuitry. A gate circuit 213 is connected to an output of the flip-flop 212 to apply a reset signal to the flip-flop 210 after 32 clock pulses at the 1.2672 MHz rate. Then a gate circuit 214 applies a signal through a trigger circuit 215 to the line 53 to bring the line 53 low and to apply a reset signal to the microprocessor 52 for initiating operation thereof. After completing a processing operation and just before power-down, the processor 52 develops a signal on a line 216 which is connected to the clock input of the flip-flop 209, flip-flop 209 being then placed in a set condition to discontinue conduction of the transistor 208 and to prevent continued application of the +VM voltage to the memory and other circuits.

An initial power-on reset conditioning operation is performed, when a battery is installed, by circuitry including a pair of trigger circuits 217 and 218 connected to the set input of flip-flop 210 and enable input of flip-flop 211, the input of circuit 217 being connected through a capacitor 220 to ground and being connected to the +V line 27 through the parallel combination of a resistor 221 and a diode 222. The lines 25, 54 and 55 are connected to the clock input of flip-flop 210 through OR gates 223, 224 and 225, connected as shown.

Input/Output Decode Circuit 62

The decode circuit 62 includes an address decoding integrated circuit 230 which has inputs connected through the lines 63-65 to three address lines of the microprocessor 52. Outputs of the circuit 230 are connected to inputs of gates 231-235 and connections are made of the output of gate 231 and line 58, of the outputs of gates 232 and 233 and line 59, and of the outputs of gates 234 and 235 and lines 60 and 61, respectively. For performing read, write and reset operations, inputs of gates 231 and 233 are connected to a read output of the microprocessor 52 and inputs of gates 232, 234 and 235 being connected to a write output of the microprocessor 52.

Low Battery Detect Circuit 74

Figure 12:
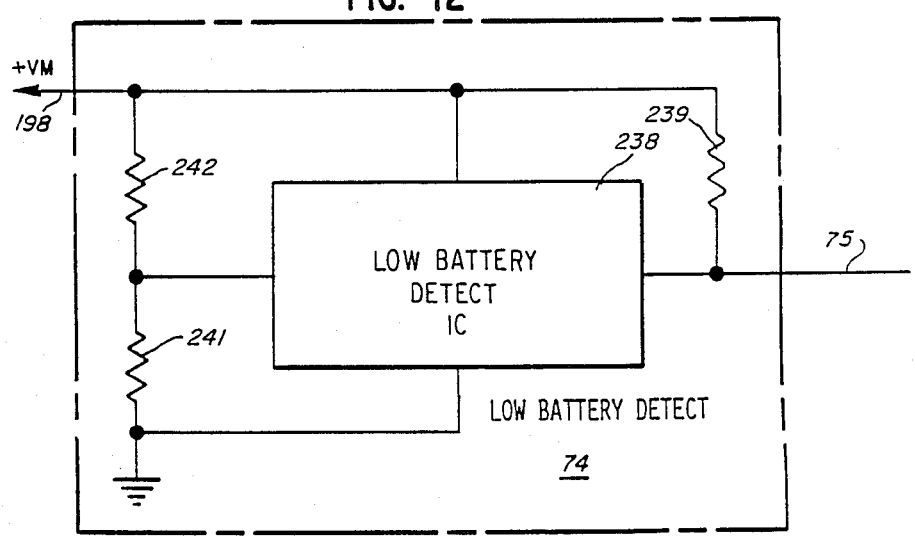
FIG. 12 is a schematic circuit diagram of low battery detect circuitry of the automatic meter reader of FIG. 2.

As shown in FIG. 12, a low battery detect circuit 74 includes an integrated circuit 238 which has an output connected to the line 75 and through a resistor 239 to the +VM line 198. A threshold input terminal of the circuit 238 is connected through a resistor 241 to ground and through a resistor 242 to the +VM line 198. When the +VM signal is applied in the power output condition and when at the same time, the battery voltage is below a certain threshold value, an output signal is applied through the line 75 to signal the low battery condition to the microprocessor 52.

Operation of AMR Microprocessor 52

Figure 13:
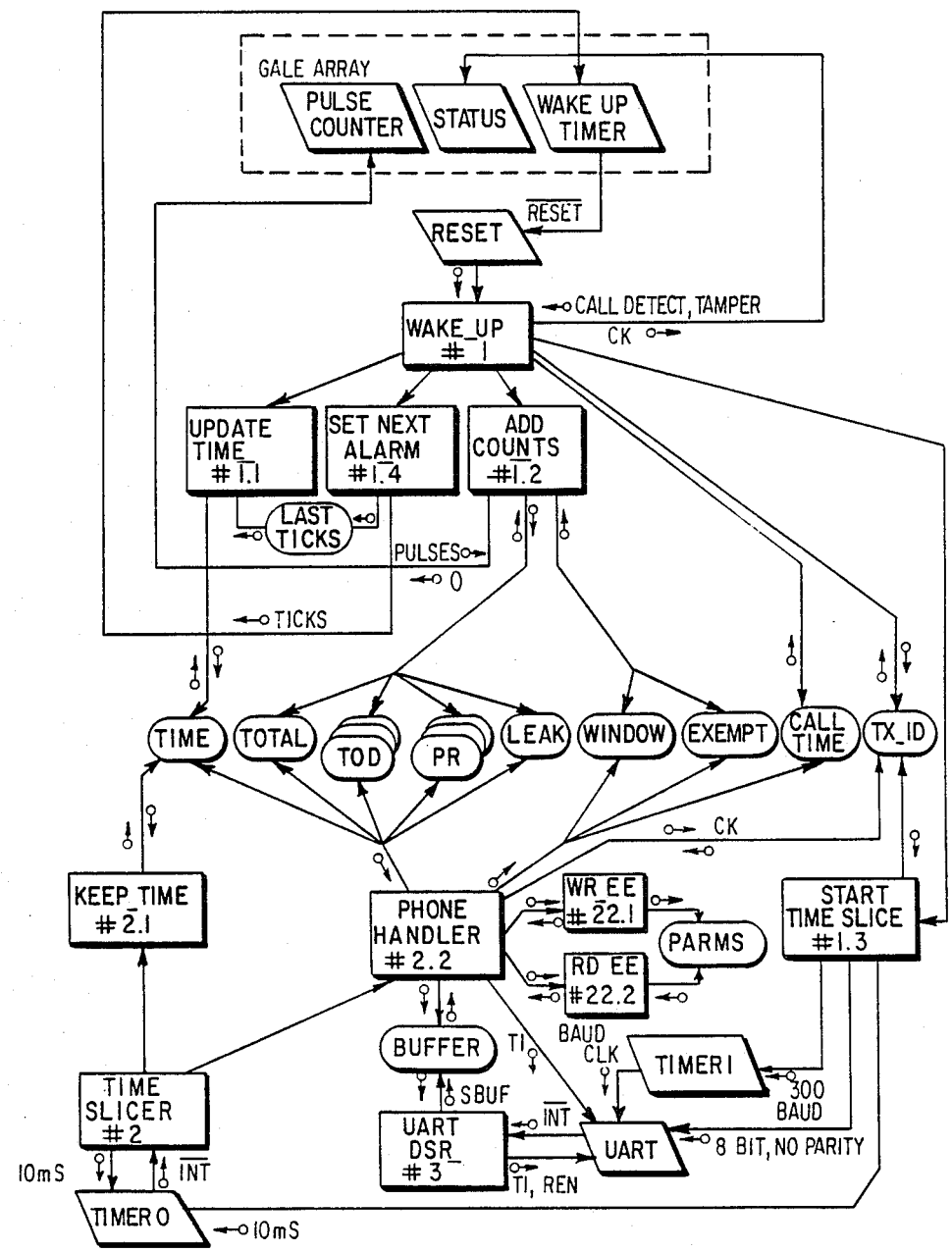
FIG. 13 is a structure chart illustrating the operation of a microprocessor of the automatic meter reader of FIG. 2.

The microprocessor 52 is controlled by a program in the program memory 67. An example of one program is contained in object code and source listing in the specification of the aforesaid U.S. application, Ser. No. 876,896 filed June 20, 1986 and an example of another program is contained in Table I of the microfiche Appendix to this specification. Each program is formulated for a type 80C31 microprocessor. FIG. 13 is a structure chart and FIGS. 14-20 are flow charts which depict the mode of operation of the microprocessor 52.

Referring to FIG. 13, the wake-up timer 41, status register 46 and meter pulse counter 43 are depicted in a broken line rectangle labeled "Gate Array", this label being applied for the reason that it is expected that the various gates and counters of such circuits and also gates and counters of the clock circuit 40 and reset and power control circuit 50 will be embodied in a single gate array integrated circuit chip.

Figure 14:
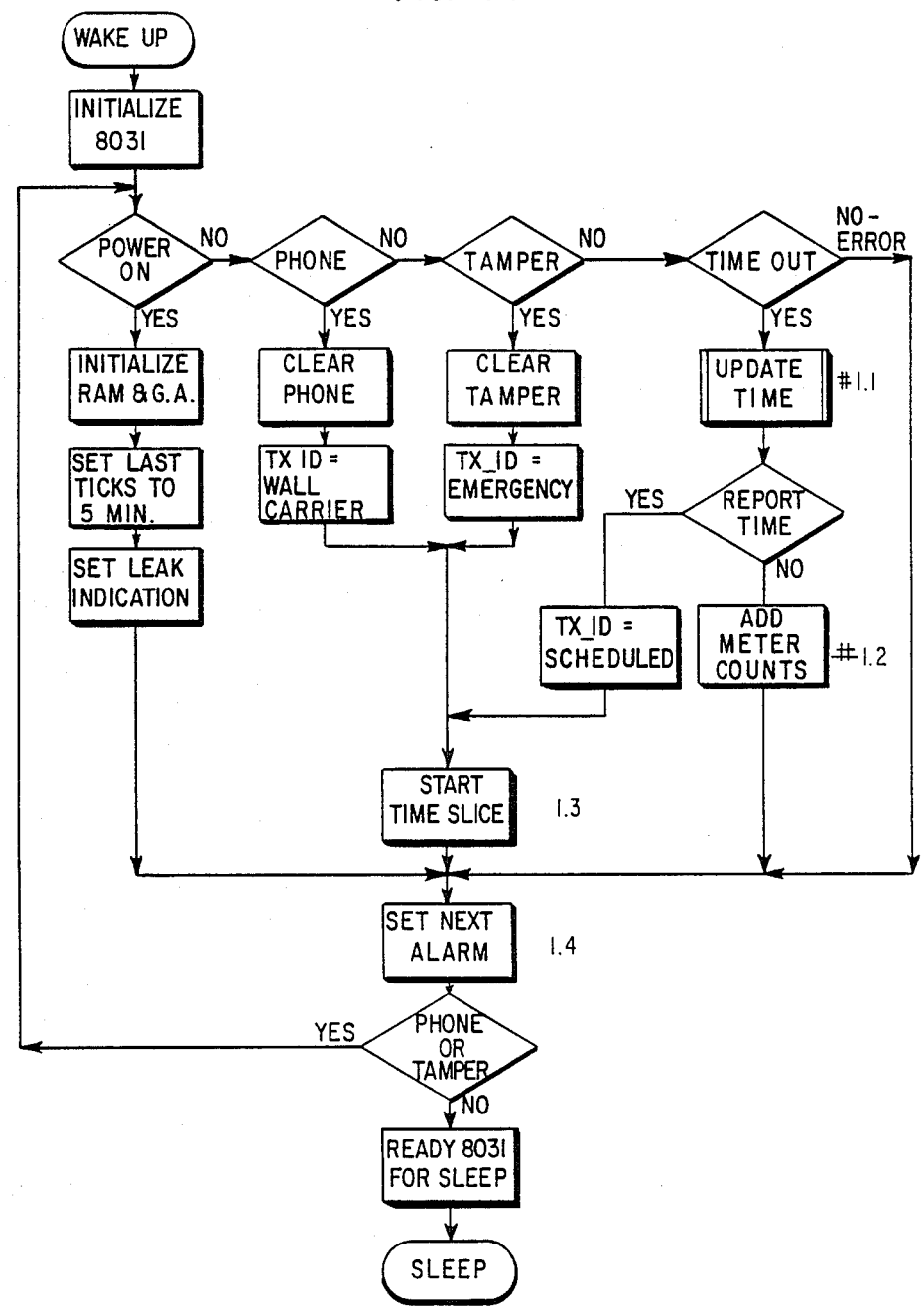
FIG. 14 is a flow chart illustrating operations performed upon receipt of a wake-up signal by a microprocessor of the automatic meter reader.
Figure 18:
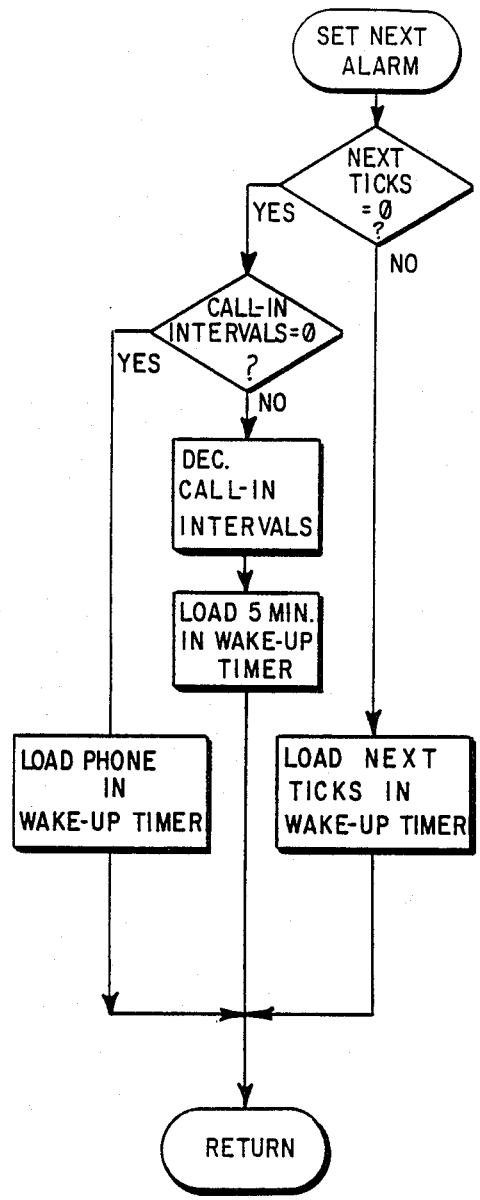
FIG. 18 is a flow chart illustrating a "SET NEXT ALARM" operation of the microprocessor.
Figure 19:
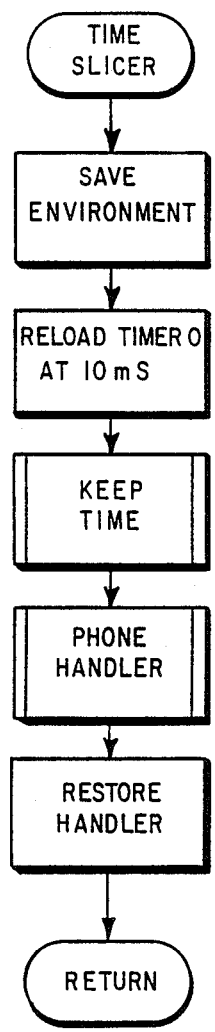
FIG. 19 is a flow chart illustrating the "TIME SLICER" operation of the microprocessor.
Figure 20:
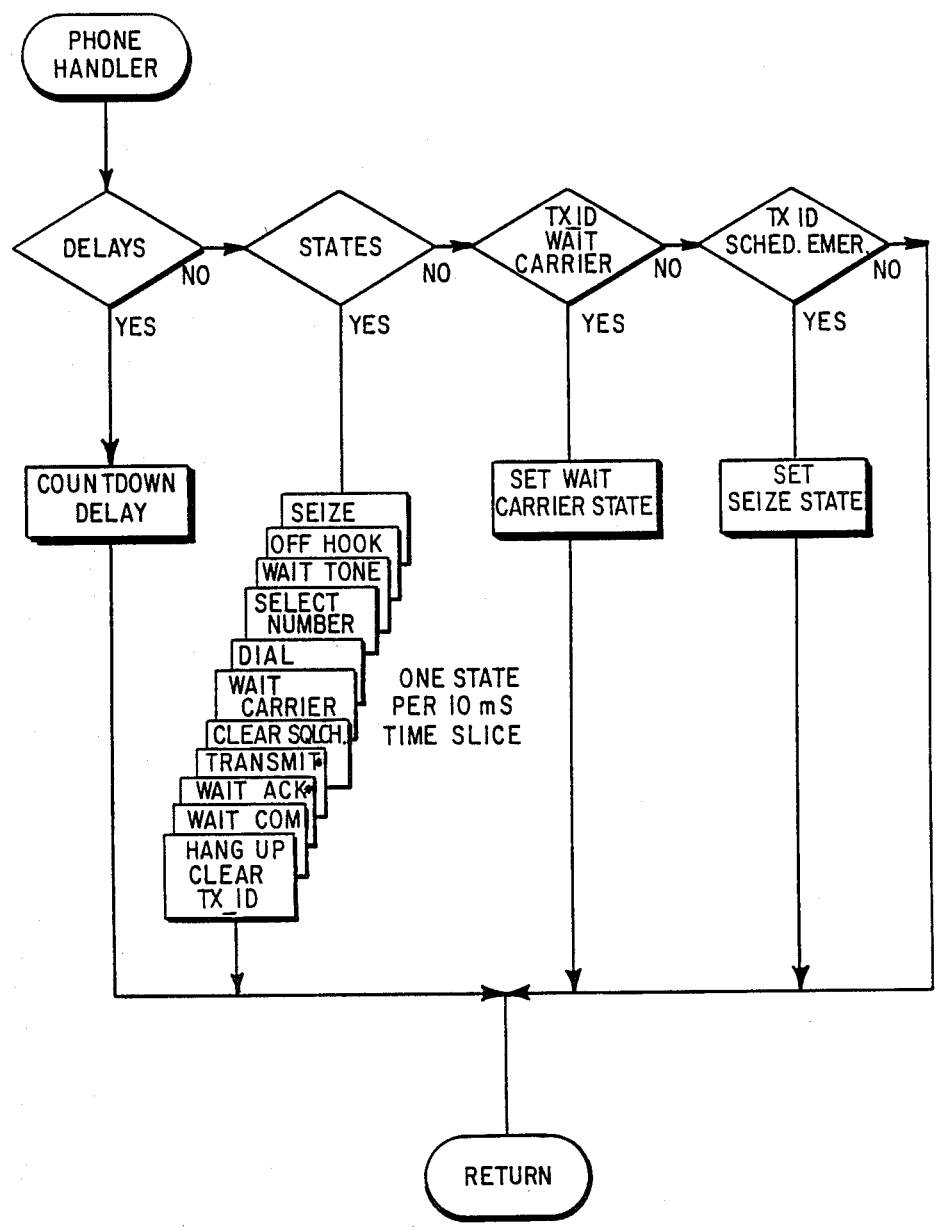
FIG. 20 is a flow chart illustrating a "PHONE HANDLER" operation of the microprocessor.

As indicated in FIG. 13, a wake-up operation is initiated from the wake-up timer or in response to call detect or tamper conditions, the wake-up operation being depicted in the flow chart of FIG. 14. This operation has various subsidiary operations associated therewith including "UPDATE TIME", "ADD COUNTS", "START TIME SLICE" and "SET NEXT ALARM" operations as depicted in FIGS. 15, 16, 17 and 18. A "TIME SLICER" operation is provided which utilizes a timer interrupt at 10 millisecond time intervals and it is used for handling telephone operations including dialing and communications through the modem. The "TIME SLICER" operation is shown in FIG. 19 while a "PHONE HANDLER" operation is shown in FIG. 20.

Memory locations or registers are provided in RAM for keeping track of elapsed time, meter data and control data. The meter data includes the accumulated total, TOD and TR totals and a leak total. The control data includes selected windows exempt times, call time and transmission control data. The access to such memory locations or registers is indicated in the structure chart of FIG. 13.

FIG. 14 illustrates the wake-up operation which is initiated in response to a signal applied through line 53 from the reset and power control circuit 50. Certain initializing operations are performed including disabling of reset, timer and UART interrupts, the initialization of a stack pointer and setting up of input-output ports to a certain condition. Then a "POWER ON" test is made to determine whether the AMR 15 is being used for the first time, after installation of a battery, which is made by determining whether certain values are stored in certain ram locations. Then initialization steps are performed, if required. If not a test determines whether there was a signal on the "PHONAL" line 55. If so, a bit of the status register is clear and a control flag or "TX-ID" is set to a "wait carrier" condition. Then the start time slice operation is performed and, as part of the time slicer operation, a phone handler operation is performed. Such operations function to make a check to determine whether the incoming telephone call was originated by the CCM and if so, to take appropriate action such as an installation transaction, a demand reading transaction, or a "brainwash" transaction. A similar sequence takes place if the wake-up was initiated in response to a tamper condition, differing in that a control flag is set to a "seize" state so that in response to the next 10 millisecond time slice interrupt, a seizure of the telephone line is initiated. The hook switch is then placed in an off/hook condition and upon receipt of dial tone, the system effects dialing of the number of the CCM 12, and then transmits data through the application of signals on the line 32 to the modem. Such data, of course, will include information as to the tamper condition, and other information as hereinafter described.

If the wake-up reset is in response to a time-out signal on line 54, an "UPDATE TIME" operation is performed, and then a scheduled report-due check is made and either the time slice operation is initated or the meter data is updated. Then the next alarm time is set in the manner as shown in FIG. 18 to load a certain count into the counters of the wake-up counter 41 and to cause the next signal on line 54 to be generated after a certain time. Then a final check is made and the microprocessor 52 places itself back in the power-down or "sleep" condition.

Figure 15:
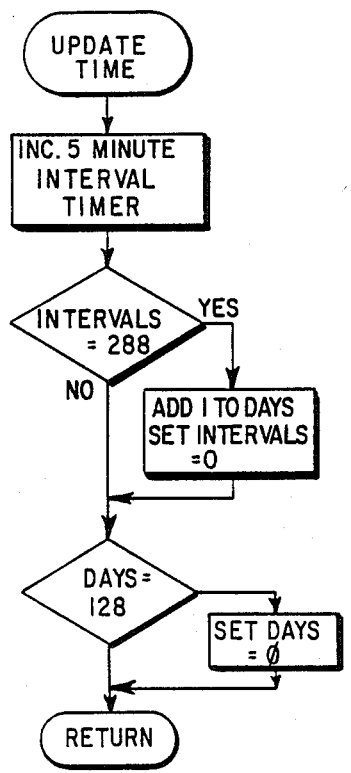
FIG. 15 is a flow chart illustrating an "UP DATE TIME" operation performed by the microprocessor.

In the "UPDATE TIME" operation of FIG. 15 a five minute interval timer is incremented and then a check is made to see whether one day has elapsed, i.e., whether 288 five minute intervals have been counted. If so, a day counter is incremented. Then if the number of days=128, the number of days is rest to φ. The five minute interval and day counters are usable in conjunction with TOD and TR metering, as determined by window and exemption day control data.

Figure 15A:
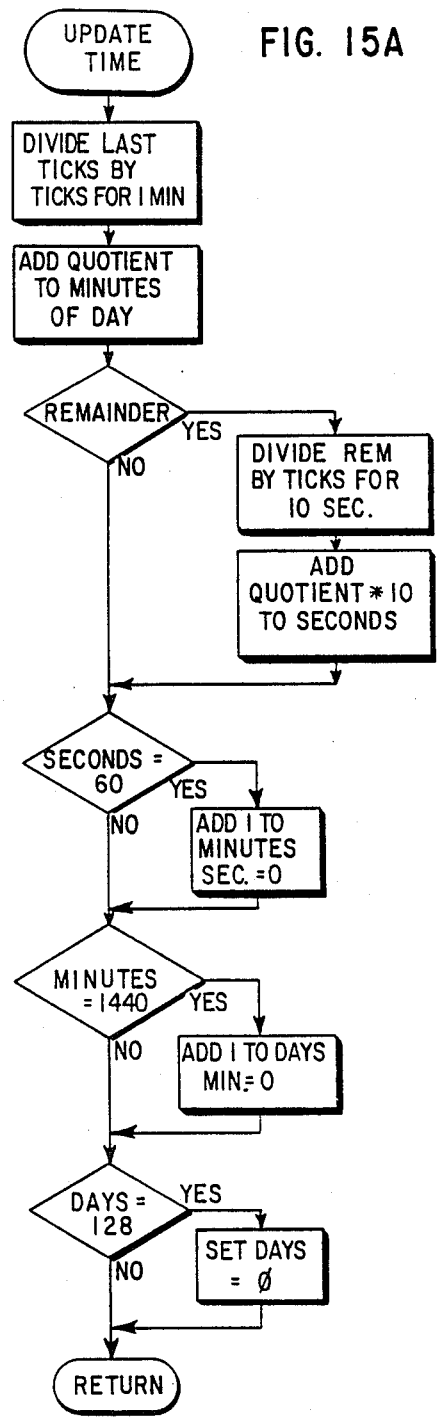
FIG. 15A is a flow chart illustrating a modified "UP DATE TIME" operation.
Figure 16:
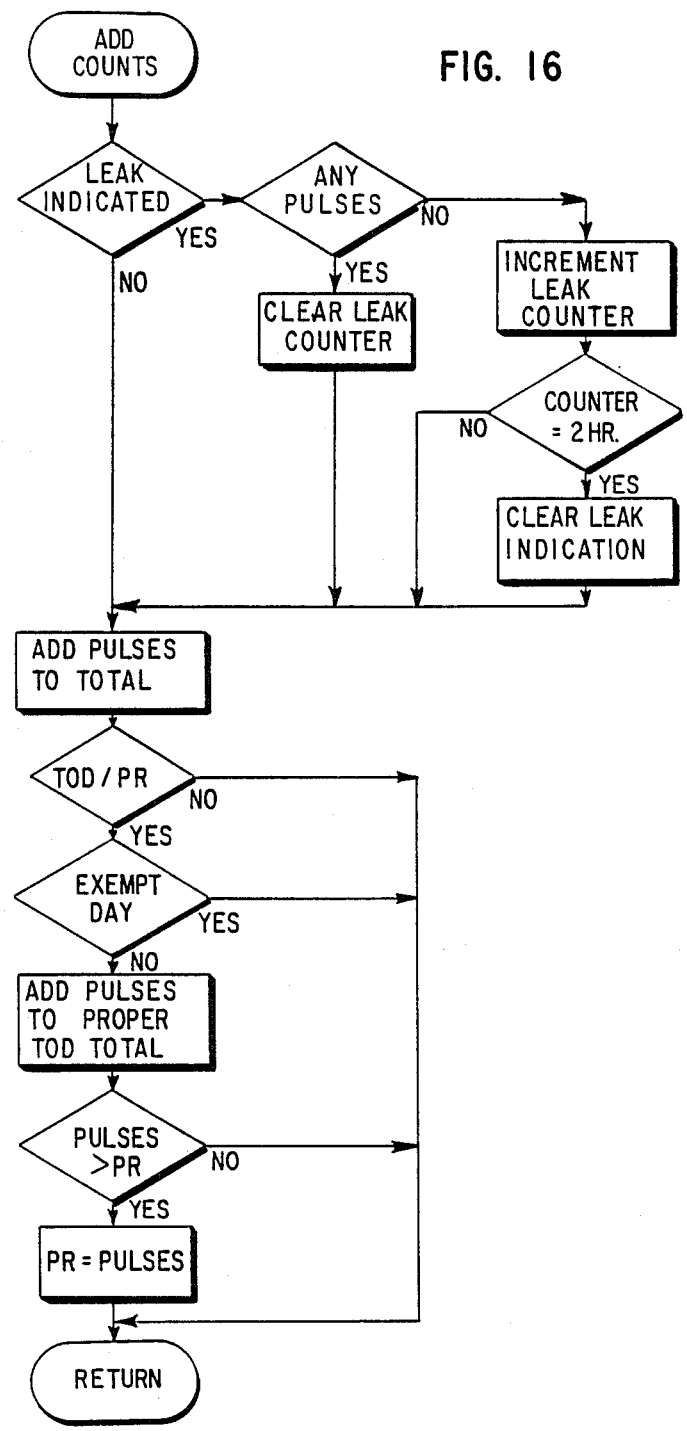
FIG. 16 is a flow chart illustrating an "ADD COUNTS" operation of the microprocessor.
Figure 17:
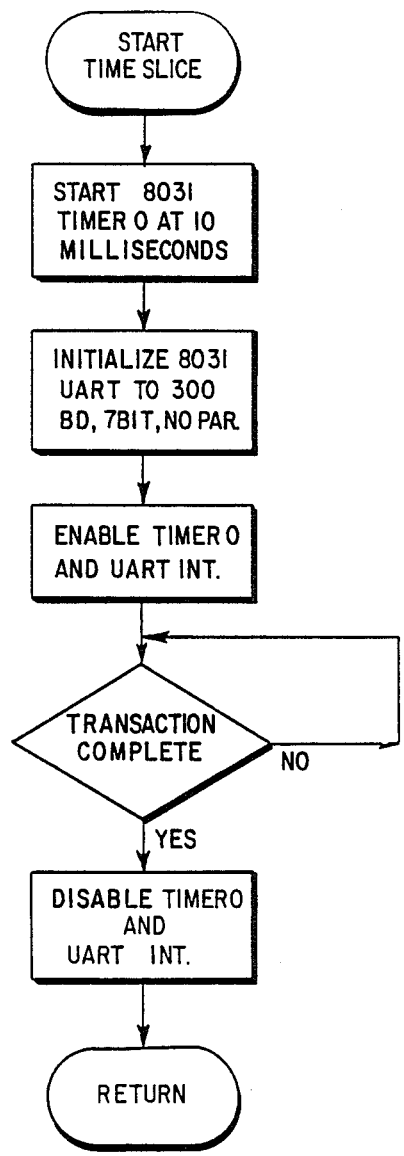
FIG. 17 is a flow chart illustrating a "START TIME SLICE" of the microprocessor.

FIG. 15A shows an alternate "UPDATE TIME" operation which is more complex and in which clock registers are provided which include day, minute and second registers, such registers being updated at certain times in accordance with current time data transmitted from the CCM 12 and being compared with call-back time data in a day, minute, second format. This alternate operation is required for use with an alternate "SET ALARM" operation of FIG. 18A and may also be used with a "SET ALARM" operation of FIG. 18 but is not required for that purpose.

To control the time of call-ins to make scheduled reports, a call-in time instruction is sent from the CCM 12 in 4 bytes. Byte 1 is called a "NEXT TICKS" byte, being immediately loaded in the wake-up timer after receipt. Bytes 2 and 3 are called a call-in interval timer and contain the number of regular five minute wake-up intervals to the next call-in. Byte 4 is called a "PHONE TICKS" byte and is loaded in the wake-up timer when the call-in interval timer is decremented to zero.

The "SET NEXT ALARM" operation is shown in FIG. 18. After a scheduled report and after loading byte 1 (the "NEXT TICKS" byte) to determine the next wake-up time, the wake-ups occur at regular five minute interval time-outs of the wake-up timer, until the number initially entered in bytes 2 and 3 (the call-in interval timer) has been decremented to zero, byte 4 (the "PHONE TICKS" byte) being then loaded in the wake-up timer. Then at the next wake-up the prior loading of the "PHONE TICKS" byte is detected to indicate that it is report time and a scheduled report transmission is initiated as shown in the flow chart of FIG. 14, resulting in loading of another "NEXT TICKS" byte 1 in the wake-up timer.

If the REPORT MADE and REPORT ALERT flags are both set, the counter of the wake-up timer 41 is loaded with a value such as to cause the next wake-up to occur in slightly less than five minutes and in normal operation it is again loaded with the same value after exactly five minutes or more accurately after a certain total number of oscillator cycles so that timeouts occur regularly at approximately five minute intervals, the accuracy being determined by the accuracy of the oscillator.

With the operation as depicted in FIGS. 14, 15 and 18, the time to the next call-in is approximately determined by the number in bytes 2 and 3 of the call-in instruction, multiplied by five minutes, plus the sum of the numbers in bytes 1 and 4 multiplied by the time between "ticks" which are applied to the wake-up timer 41, which may be approximately 1.93 seconds in the illustrated embodiment. Typically, the time interval from one call and to the next will be an integer number of five minute intervals and, initially, the total of bytes 1 and 4 will correspond to a five minute interval, being determined in accordance with the times by which the desired call-in time precedes and follows five minute clock times. For example, if the desired call-in time is at 2:11:20 AM, byte 1 would correspond to 220 seconds and byte 4 would correspond to 180 seconds. If the call-in occurs too early or too late, either byte 1 or byte 4, or both, may be adjusted to compensate for the initial error and to also compensate for the error which might be expected if the drift of the oscillator continued at the same rate.

If the next call-in occurs at the desired time, one or the other of the bytes may be adjusted in a direction to offset the compensation for the initial error. In following call-ins, if the drift continues at the same rate, no further adjustments will be required. Bytes 2 and 3 are typically changed to accommodate changes in the number of days in a month while providing a call-in at the same day of each month. The arrangement is quite flexible in that any one of a number of different modes of operation may be obtained through programming of the data sent from the CCM 12. At the same time, the control data is compressed with the number of required bytes being minimized. Also, the AMR 15 is not required to maintain a highly accurate clock or a clock which can be reset from the CCM. At the same time, reasonably accurate TOD and PR windows are obtained and call-in times can be quite accurately controlled to minimize the possibilities of interference.

Figure 18A:
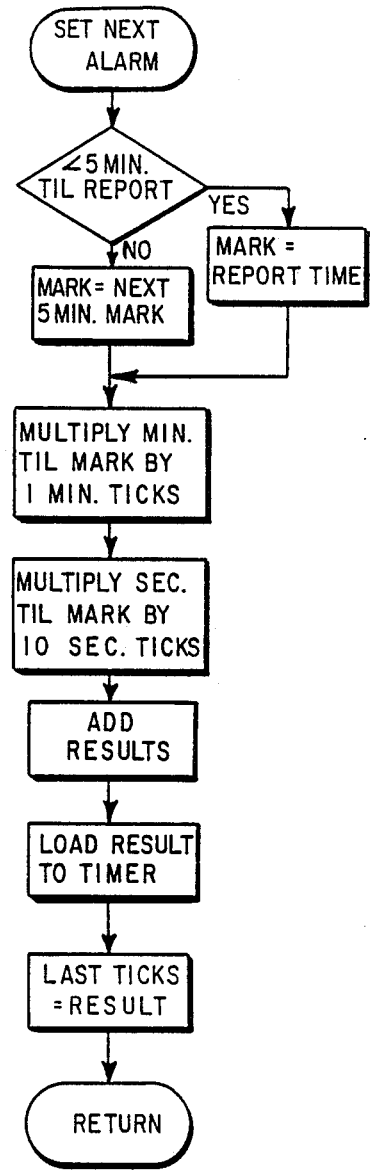
FIG. 18A is a flow chart illustrating a modified "SET NEXT ALARM" operation of the microprocessor.

FIG. 18A illustrates a modified "SET NEXT ALARM" operation usable with the modified "UPDATE TIME" operation of FIG. 15A. A register of current time in a day, minute and second format is maintained 3 bytes in RAM and is updated in scheduled report transactions. The "UPDATE TIME" operation of FIG. 15A then keeps it current and it is compared with a 3 byte call-in time register which is loaded from the CCM 12 during a scheduled report transaction. When the comparison shows that there is less than 5 minutes until the report time, the required number of ticks is computed and loaded into the wake-up timer.

Another important feature of the invention relates to the detection of leaks which is especially important in metering of water consumption. As shown in the "ADD METER COUNTS" flow chart of FIG. 16, a test is made after each five minute time-out to determine whether a leak is indicated, a leak status bit being normally set to indicate a leak, after each scheduled report, installation transaction or demand reading transaction. If the status bit is set, a check is made as to whether any pulses were received in the last five minute interval. If pulses have been received, a leak counter is cleared. If not, the leak counter is incremented and then a check is made to see whether two hours have elapsed, i.e. whether twenty-four five minute intervals have been counted. If not, the operation is continued. If the leak counter is full, then the leak indication is cleared. This arrangement thus requires that in the time between reports, no meter pulses be received for a sampling time period of two hours, such a time period being appropriate for residences and for many businesses having water meters. The sampling time period may, of course, be changed from two hours to some other value. The arrangement permits detection of leakage conditions which are potential dangerous or destructive as well as being wasteful and which might otherwise be detected only after severe damage has occurred.

UTILITY CONTROL CENTER 11

Figure 21:
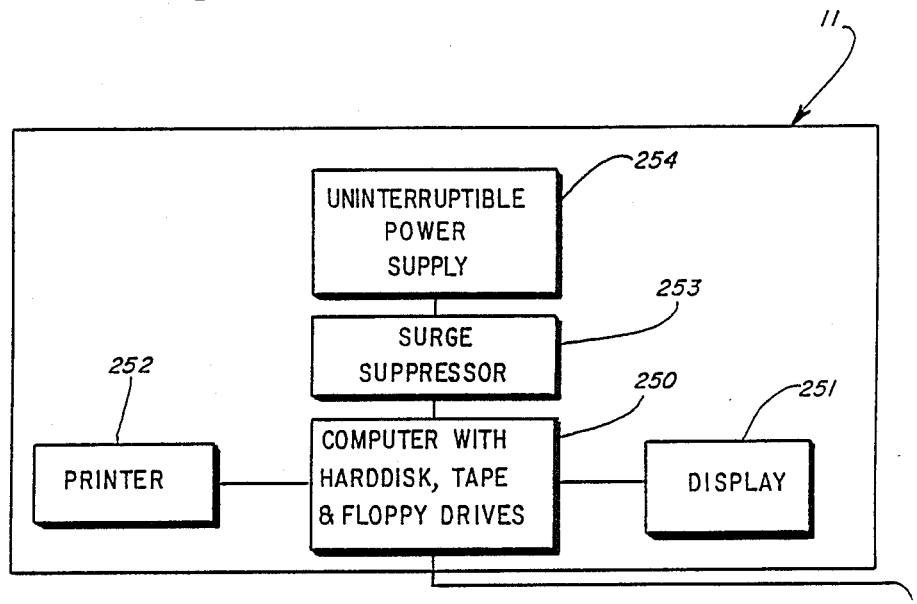
FIG. 21 is a schematic block diagram of equipment and components of a utility control center and FIG. 22 is a schematic block diagram of call collection module of the system of FIG. 1.

The utility control center 11 is shown diagrammatically in FIG. 21 and it includes a computer 250 with a hard disk drive, a floppy disk drive and an optional tape drive. The computer 250, in the embodiment as herein shown and described, is an IBM PC AT computer. Computer 250 is connected to a display 251 which may be an enhanced color display but a monochrome display may be used, if desired. Computer 250 is also connected to a printer 252 and it is powered through a surge suppressor 253 from an uninterruptable power supply 254.

CALL COLLECTION MODULE 12

Figure 22:
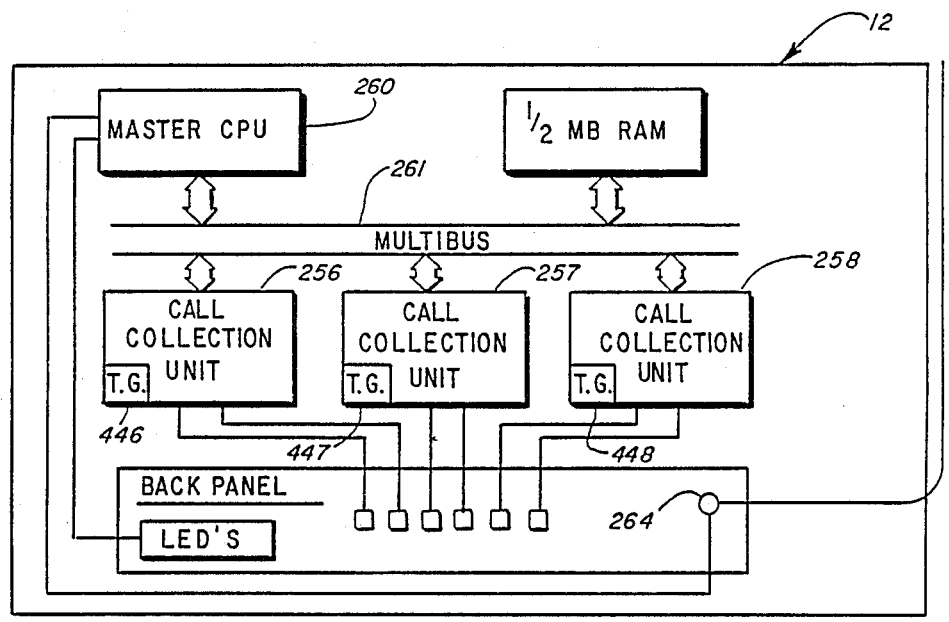
Figure 23:
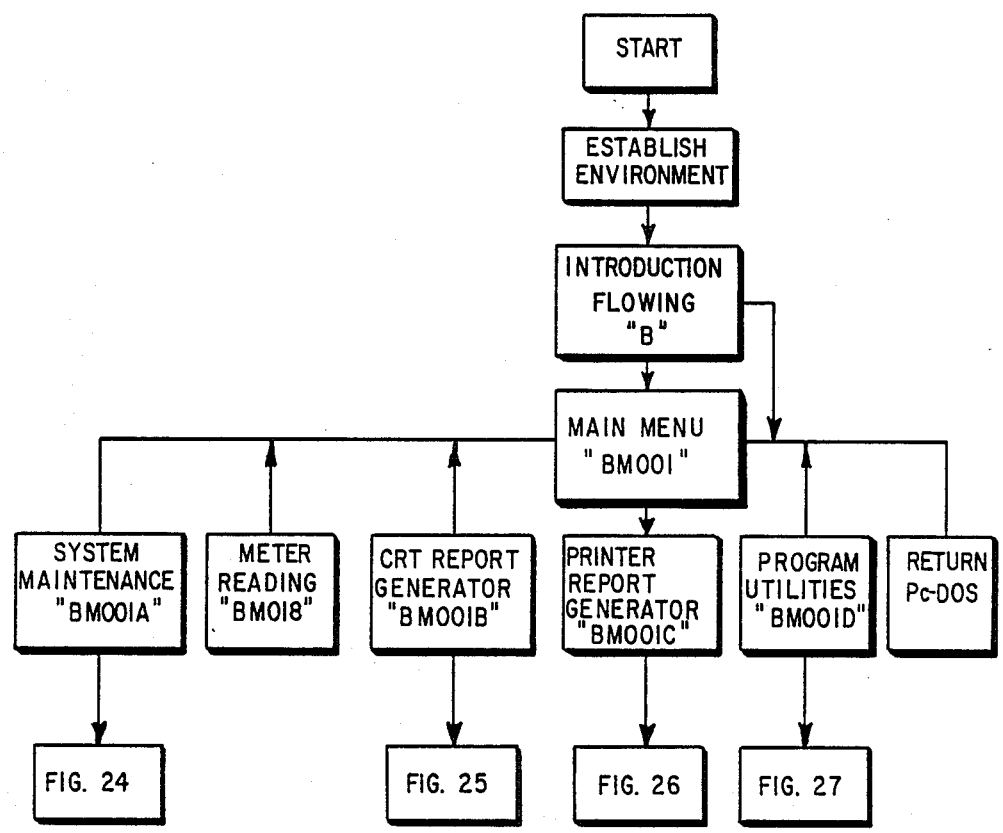
FIGS. 23-27 are flow charts illustrating the operation of the utility control center.
Figure 24:
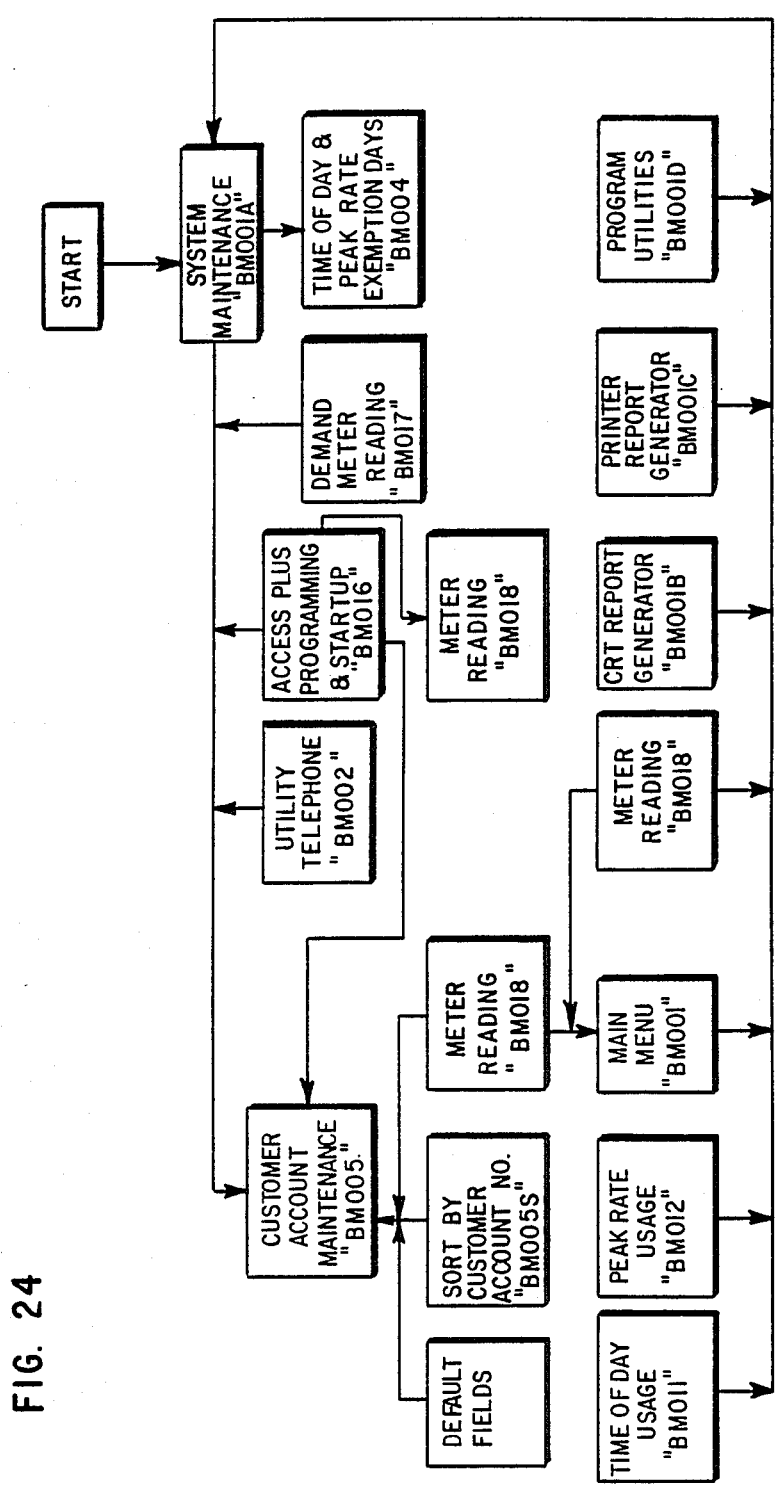
Figure 25:
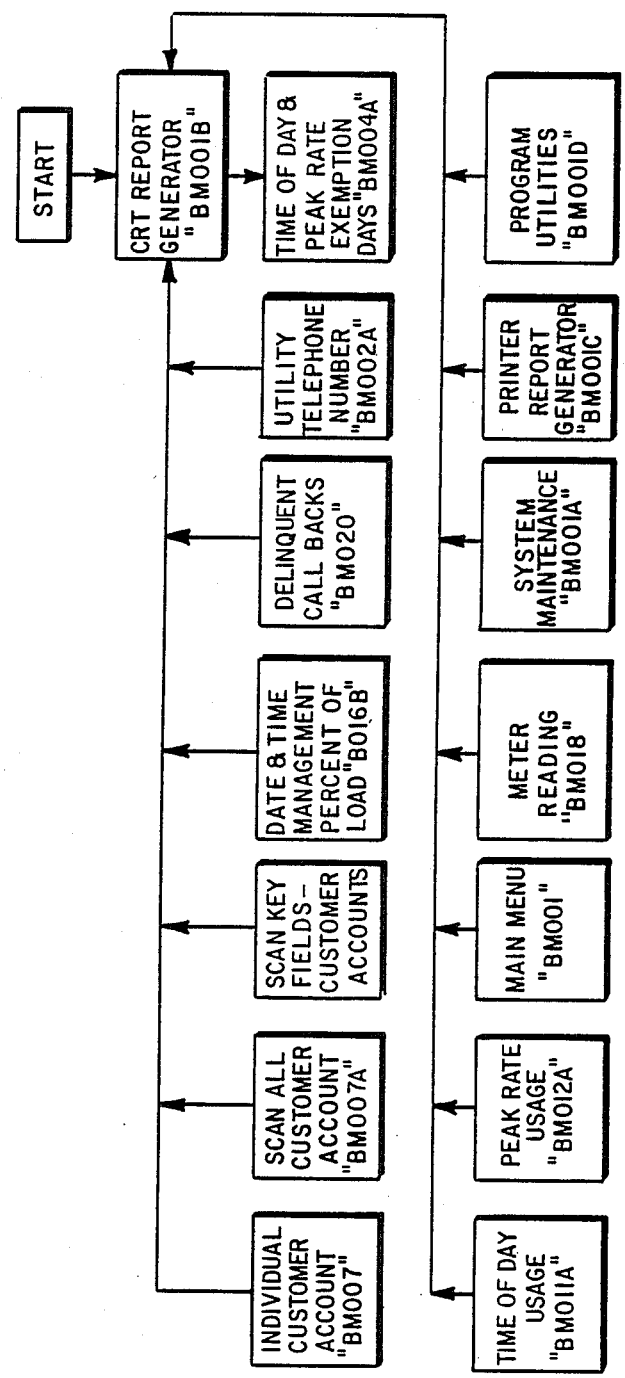
Figure 26:
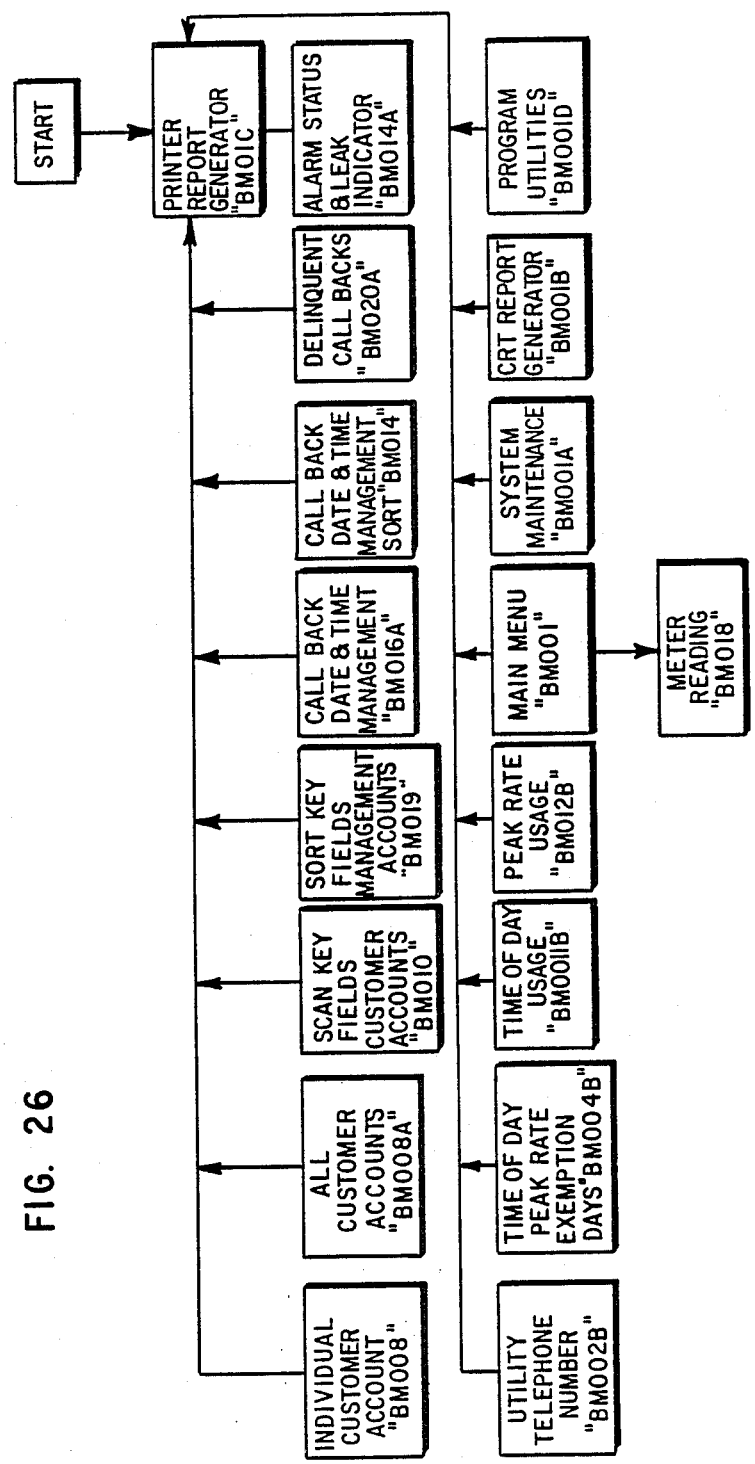
Figure 27:
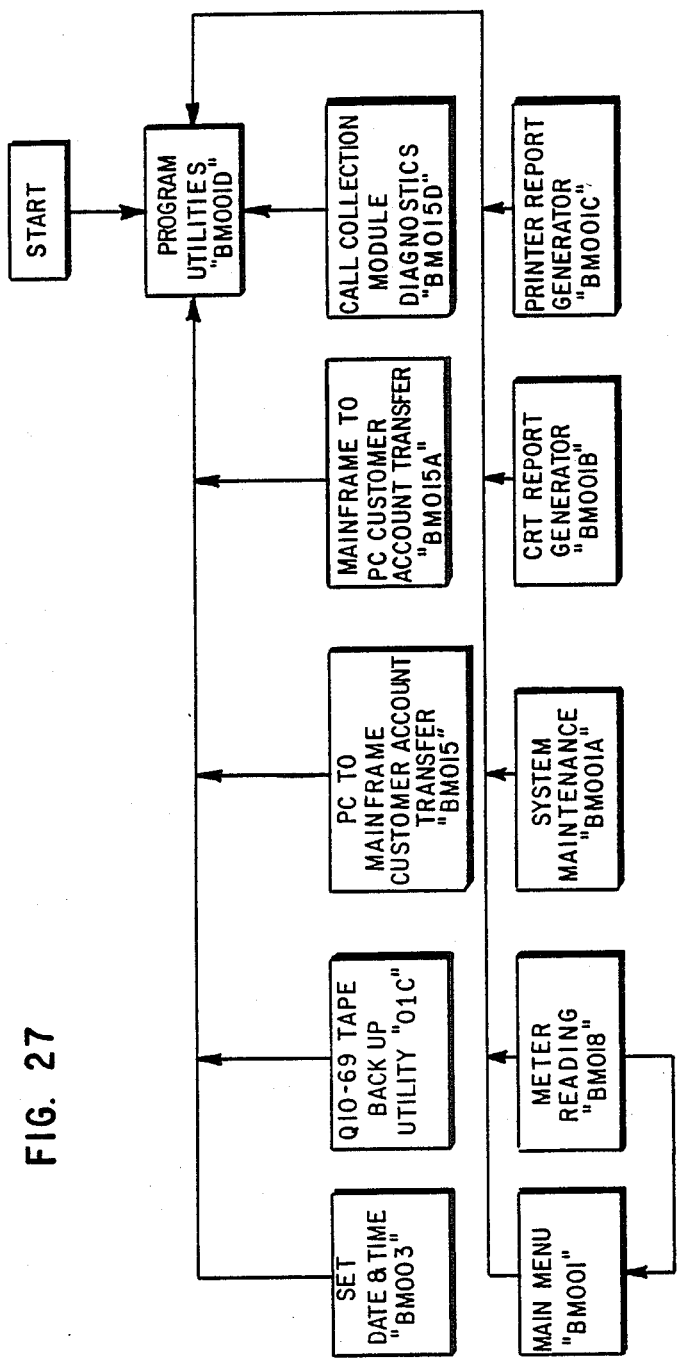

As also shown diagrammatically in FIG. 22, the call collection module 12 comprises three call collection units 256, 257 and 258, a master central processing unit 260 and a RAM 261, all connected to a multi-bus 262. The RAM 261 may have a one-half megabyte capacity. Each of the call collection units 256, 257 and 258, in the illustrated embodiment, is a type mSBC 86/35 single board computer manufactured by Micro-Industries, Westerville, Ohio. Each such single board computer has an on-board local bus which is connected to a type mSBX 355 board to interface with standard modems for connection to two telephone lines. Control and dialing means are provided for responding to an incoming call and for seizing a line and making an outgoing call, as required. Each of the call collection units 256, 257 and 258 has 512K bytes of memory of which approximately half are available for temporary storage of incoming meter data. The master central processing unit 260 is also an mSBC 86/35 single board computer and it is provided with a serial communications controller and a serial interface to the UCC 11, being connected thereto through a cable 264. A conventional RS 232 interface may be used, and a 9600 baud rate is used in communications between the CCM and the UCC. The master central processing unit 260 is also connected to indicator lights 265 on a back panel 266 which carries jacks for the six telephone lines 3 as well as a connector for the UCC 11.

With a UCC 11 and a CCM 12 as shown and with programming as hereinafter described, a very large number of AMR's 15 can be accomodated for efficient, accurate and reliable receipt of meter data therefrom and for compilation, printing, storage and transmission of such data to facilitate billing of customers, keeping records and analyses of operations.

Operation of Utility Control Center 11

An important function of the UCC 11 is to facilitate entry of control data which is temporarily stored and which can be edited as required, such control data being transmitted to the CCM 12 in a certain form and being translated by the CCM 12 into a form in which it can be stored in RAM of the CCM 12, to be transmitted to the AMR's 15 in an initial installation transaction and also in subsequent scheduled report transactions. The UCC 11 is also operative to receive and store data from the CCM 12 and to store such data, being also operative to disassemble data and to place it in proper fields, compute the next call-in date, and analyze data as well as storing data. It is also, of course, usable to print-out data, using the printer 253.

An exemplary program for the UCC 11, written in the BASIC language, is listed in Table II in the specification of the aforesaid U.S. application Ser. No. 876,896 filed June 20, 1986 and another is listed in the microfiche Appendix to this specification. Each program is written in modules, the first having the name "AMR" and the second having the name "ACCESS". The remaining listed modules, with the exception of an "LPRINT" module for program listings, has a name in the form of an identifying number, preceded by "BM".

The mode of operation of the UCC 11 is illustrated in the flow charts of FIGS. 23–27 in which the names of the listed program modules are set forth, for reference. At start-up, an operating system is loaded from a disc into the computer 250 and then the meter reading operating system is loaded from a disc into the computer, the "AMR" and "ACCESS" modules being run. Initially, an introductory screen is produced which includes a "Flowing 'b'" or moving statement "Press Any Key To Start" and, upon pressing any key, a module BM001 operates to produce a main menu which permits selection of any one of the following:

System Maintenance
Meter Reading
CRT Report Generator
Printer Report Generator
Program Utilities
Return to PC-DOS The "System Maintenance" option is used in initialization of the system. It uses a program identified as "BM001A" and it is depicted in the flow chart of FIG. 24, being operative to display a menu with a large number of items from which to select. This menu is produced from program lines 160–300 and is as follows:

System Maintenance Menu

Customer Account Maintenance
Utility Telephone Number
Access Plus (TM) Programming & Startup
Demand Meter Reading
Time of Day & Peak Rate Usage
Time of Day & Peak Rate Exemption Days
Time of Day Usage
Peak Rate Usage Main Menu Return To Main Menu
Meter Reading
CRT Report Generator
Printer Report Generator
Program Utilities The first item "Customer Account Maintenance" is usable for adding, changing or deleting customer accounts. In adding or changing accounts, a menu is produced in which information as to the items listed in the data statements at lines 430–780 of the AMR module (see first page of Table II of the microfiche Appendix). This menu is as follows:

| | |
|---|---|
| Customer Name | ? — — — — — — — — — — — — — — — — — — — — |
| Address | ? — — — — — — — — — — — — — — — — — — — — |
| City & State | ? — — — — — — — — — — — — — — — — — — — — |
| Zip Code | ? — — — — — — — |
| Cust Phone Number | ? — — — — — — — — — |
| Meter Mfg | ? — — — — — — — — — — — — — |
| Type Model & Size | ? — — — — — — — — — — — — — |
| Configuration/TC: | ? — — |
| Meter Serial # | ? — — — — — — — |
| Access + Serial #: | ? — — — — — — — |

-continued

| | |
|---|---|
| Battery Pack Code | ? — —    — —    — —    — — |
| Leak Indicator: | ? — — |
| Call In Attempts: | ? — — |
| Call In Frequency: | ? — — |
| Call Back Date: | ?            —           — |
| Call Back Time: | ? — —:— —:— 0 |
| Account Status | ? — — |
| Prev Mtr Rdng: | ? — — — — — — — — |
| Pres Mtr Rdng: | ? — — — — — — — — |
| Dt Prev Mtr Rdng: | ?       —         — |
| Dt Pres Mtr Rdng: | ?       —         — |
| Tm Prev Mtr Rdng: | ? — —:— —:— 0 |
| Tm Pres Mtr Rdng: | ? — —:— —:— 0 |
| Time of Day Usage | ? — — |
| Usage Period #1: | ? — — — — — |
| Usage Period #2: | ? — — — — — |
| Usage Period #3: | ? — — — — — |
| Calculated Usage | ? — — — — — — |
| Peak Rate | ? — — |
| Rate Period #1: | ? — — — — |
| Rate Period #2: | ? — — — — |
| Rate Period #3: | ? — — — — |
| Access + Password | ? — |
| DTM Deletion Code: | ? — — — — — — — |

The operator enters or edits appropiate items, such as "Customer Name", "Address", "Cust Phone Number", etc. and when the items appear to be satisfactory to the operator, the information may be stored on hard disc and may also be sent to the CCM 12.

An important feature relates to entry of call back dates and times. If such are not filled in or entered, the program operates to automatically set a time and date. If a date only is selected, and the time is left open, or vice versa, the program automatically sets the time or date. If both a time and a date are selected, they will be used unless previously set for another customer.

The call-ins may be set to occur on a daily, weekly, monthly or quarterly basis and if a date is selected by the operator, subsequent call-ins will be automatically set by the program. For example, if a monthly call-in is selected and if the fifth day of a month is selected, call-ins will be made on the selected day and on the fifth day of each subsequent month. The 29th, 30th and 31st days of a month are not accepted.

Data of a "global" nature are entered separately and are used for all customers or as "default" data to be used if not overridden for a particular customer. Utility telephone number data and CCM set-up data are entered using a menu as indicated at lines 130-160 of module BM002. Time of day and peak rate exemption day data are entered for each year using a menu as indicated at lines 120-230 of module BM004. Time of day and peak rate windows are entered using menus as indicated at lines 130-200 of module BM011 and lines 130-200 of BM012. After entry of control data, the system may be immediately placed in a meter reading mode or state or, if left in any other state and no action is taken after elapse of a certain interval of time, the system automatically reverts to the meter reading mode. This feature insures that the UCC 11 will collect data from the CCM when left unattended overnight or for substantial intervals of time.

In the meter reading mode, program module BM018 is operative. Referring to line 470, a command M$ is sent to file #4 which is CCM 12. M$ is initially defined as "DUMP" in line 180 and sending it causes the CCM 12 to send or dump transaction data. Then M$ is defined as "N" in line —470 which causes the CCM 12 to send or dump the next transaction data to the UCC 11. This operation continues until all transactions which have been sent to and processed by the CCM 12 are dumped to the UCC 11. When all available transaction data have been dumped to the UCC 11, the CCC 11 program will operate in a continual loop, operating to receive more data as it becomes available as a result of receipt and processing of AMR data by the CCM 12. The loop may, of course, be interrupted at the UCC 11 to perform other operations in which case the CCM 12 stores up data in its memory for sending to the UCC 11 at the request of the UCC 11.

As transaction data is received at the UCC, it is disassembled and placed in proper fields. The next callback date is computed and checked with that sent from the CCM 12 which will have independently computed the call-back date and which will have sent it to the reporting AMR 15 during a scheduled report transaction. This call-back date computation and check is made to detect possible malfunctions and if an error is detected, it is reported.

The UCC 11 also analyzes alarm condition data and indicates and prints alarm data. Received data are sent to the disc drive for storage with a format such that they can be readily retrieved and sent to processing equipment for sending of bills to customers and for record-keeping and such other purposes as may be desired by a utility or municipality.

The program of the UCC 11 also includes many advantageous features relating to display and printing of control, meter and status data. The program modules BM001B and BM001C are usable for control of display and printing of items as indicated in lines 160-310 of module BM001B (CRT Report Generator Menu) and lines 160-340 of module BM001C (Printer Report Generator Menu), by chaining of other modules as respectively indicated in lines 660-790 of module BM001B and lines 690-850 of module BM001C. The CRT and Printer Report Menus are as follows:

CRT Report Generator

Individual Customer Account

Scan All Customer Accounts
Scan Key Fields-Customer Accounts
Date & Time Management Percent of Load
Delinquent Call Backs
Utility Telephone Number
Time of Day & Peak Rate Exemption Days
Time of Day Usage
Peak Rate Usage Main Menu Return To Main Menu
Meter Reading
System Maintenance
Printer Report Generator
Program Utilities Printer Report Generator Individual Customer Account
All Customer Accounts
Scan Key Fields-Customer Accounts
Sort Key Fields-Customer Accounts
call Back Date & Time Management Call Back Date & Time Management Sort
Delinquent Call Backs
Alarm/Status & Leak Indicator Sort
Utility Telephone Number
Time of Day & Peak Rate Exemption Days
Time of Day Usage
Peak Rate Usage Main Menu Return to Main Menu
Meter Reading
System Maintenance
CRT Report Generator
Program Utilities The operator can readily and quickly obtain all data required for ascertaining the status of operations and for facilitating accurate control of all operations.

For communication between the UCC and CCM, the system operates at 9600 Baud, with 8 data bits, 1 stop bit and no parity, and ASCII characters are used, the ASCII carriage return (CR) being allowable. The following specifications apply to the form of messages:

A. Command Formats
   All commands are of the general form:
       COMMAND [KEYWORD=VALUE [KEYWORD=VALUE]...
   where
       COMMAND identifies the specific action that is
       being requested;
       KEYWORD identifies a parameter associated with
       the command;
       VALUE is the value being assigned to the
       associated keyword.
   Depending on the command, there may be any number of keyword values assigned. NOTE: the square brackets in the general form of the command are not part of the command string; they are used in the command form description to indicate that the keyword/value pair may be optional (depending on the command). The CCM will always respond to any command from the UCC with either response "OK" or "REJECT". If the response is "REJECT", an error code is also indicated in the response. Each response line is terminated with a carriage return and a line feed.
   The error codes that are returned with the "REJECT" response are command-specific. However, the following error codes are possible with all commands:
       1 - command not recognized
       2 - command not yet implemented
       3 - invalid keyword
       4 - insufficient data available to service command B. Commands Originated by the UCC
   1. PARAM - global parameter initialization
      a. General Description
         This command is used to set the values for certain parameters that are used globally by the CCM (i.e. they are not specific to a particular AMR).
      b. Allowed keywords and associated values
         PHONE - utility phone number.
         TOD - default indication of whether TOD calculations are to be performed.
         PR - default indication of wheather TOD and PR calcuations are to be performed on a 5-day or 7-day schedule.
         WINDOWS - TOD/PR window definitions.
         CALLBACK - next call-in interval width.
         MODE - CCM mode of operations.
      c. Additional error codes
   2. PREINSTALL - load pre-installation data
      a. General description
         This command is used to pre-load the CCM with information that will be used later with an INSTALL command. By preloading the information using this command, the amount of information required by the INSTALL command is minimized Thus, the CCM can be pre-loaded by the UCC and the INSTALL command could be more easily issued at a "dumb" ASCII terminal.
         The PREINSTALL command does not initiate a phone -continued call; it merely loads the pre-installation data into the CCM memory.
    b.  Allowed keywords and associated values:
           ACCT - account number. This parameter is required, as it is used to cross-reference the data in this command with the associated INSTALL command
           MPHONE - phone number which is dialed to call the AMR.
           PHONE - phone number which is the AMR must call in order to call the CCM. If this parameter is not present the PHONE parameter loaded by the PARAM command is used.
           CALLIN - the next scheduled call-in time for the AMR.
           CALLBACK - used to override the global (via PARAM command) CALLBACK interval width.
           PREV - previous meter reading for the meter. If this parameter is missing the value 000000 is used.
           TOD - used to override the global (via PARAM command) TOD value.
           PR - used to override the global PR value.
           PRMODE - used to override the global PRMODE value.
           METER - meter definitional status' defaults to "ON".
           WINDOWS - used to override the global WINDOWS value.
           SERNO - the serial number of the AMR. This parameter is normally sent with the associated INSTALL command.
    c.  Additional error codes
           10 - insufficient memory to load pre-installation data.
3.  INSTALL - perform AMR installation
    a.  General description
        This command will cause an installation phone call to be placed to the specified AMR. The "OK" response does not return until a phone line is assigned for the call. Any of the parameters may be given in associated PREINSTALL command; the ACCT parameter is used to cross-reference the data. If a given parameter appears in both the INSTALL and PREINSTALL command for a given ACCT number, the value specified in the INSTALL command is used.
    b.  Allowed keywords and associated values
        All keywords described for the PREINSTALL command also apply to the INSTALL command.
    c.  Additional error codes
        20 - ACCT parameter not supplied
4.  KEYS - load security key
    a.  General description
        This command is used to load the security keys into the CCM memory. Sixteen security keys must be loaded using separate KEYS commands before the CCM will become operational.
    b.  Allowed keywords and associated values
        INDEX - the index associated with the given key. This value must be in the range 0 to 15.
        KEY - four hexadecimal values specifying the four bytes of the security key.
    c.  Additional error codes
5.  SCHEDULE - load scheduled call modification information
    a.  General description
        This command is used to load information into the CCM that will be sent to a specified AMR when it calls in for its next scheduled report. This command is issued for a given AMR account number only if there is a need to modify either the global parameter data (see PARAM command) for the particular AMR or existing operational data in the AMR.
    b.  Allowed keywords and associated values
        The ACCT, CALLIN, CALLBACK, TOD, PR, PRMODE METER, and WINDOWS (see PARAM and PREINSTALL commands) are the allowed parameters for the SCHEDULE command. The ACCT parameter is used to identify the AMR when it calls in.
    c.  Additional error codes
        10 - insufficient memory in the CCM to hold the SCHEDULE data.

6. DEMAND - load demand call information
   a. General description
      This command is used to load information for a
      Demand Reading call into the CCM memory. The CCM
      will then place the call when a line becomes
      available. The "OK" message is returned to the
      UCC after the data has been placed into the CCM
      memory; the "OK" response does not mean that the
      call has been placed.
   b. Allowed keywords and associated values
      This command allows all the keywords that are
      recognized by the SCHEDULE command. Additionally
      the SERNO parameter (see PREINSTALL command) is
      required.
   c. Additional error codes
      10 - insufficient memory in CCM to hold DEMAND
      data.
7. EXEMPTIONS - load exemption days
   a. General description
      This command is used to load the exemption days for
      an entire year into the CCM memory. If the year
      specified is the current year, than any existing
      days for the current year are deleted before
      storing the new ones. If the year specified is
      for the next year, then they are added to the
      existing list of exemption days (in the CCM
      memory).
   b. Allowed keywords and associated values
      YEAR - specifies the year for which the exemption
      days are being entered.
      DAY - specifies one exemption day in the form
      "mm/dd";
      each exemption day may be specified using a
      separate DAY keyword/value pair, or multiple days
      (separated by commas) may be provided with one DAY
      keyword.
   c. Additional error codes
      30 - invalid year (neither current year or next
      year)
8. DUMP - request AMR call data
   a. General description
      This command is used by the UCC to request that
      Scheduled Report transaction data be dumped from
      the CCM. The data is dumped one transaction at a
      time. At the end of each transaction dump, the CCM
      waits for a "command" character from the UCC what
      specifies what the CCM is to do next. These
      characters are as follows:
         Q - quit dumping data; the CCM will then
         respond "OK".
         N - dump next transaction data
   b. Allowed keywords and associated values No
      keywords are recognized by this command.
   c. Additional error codes
      40 - no transaction data is available.
9. GETTIME - read CCM time and data
   a. General description
      This command allows the UCC to read the current
      time and date that the CCM is keeping.
   b. Allowed keywords and associated values This
      command requires no keyword parameters.
   c. Additional error codes
      None.
10. SETTIME - set CCM time and date
    a. General description
       This command allows the UCC to set the time and
       date in the CCM.
    b. Allowed keywords and associated values
       DATE - the current date.
       TIME - the current time.
    c. Additional error codes
       50 - invalid date
       51 - indalid time
11. REQOLD - request old information report
    a. General description
       This command is used to query the CCM for "old"
       information that may be in its data bases
       (scheduled report changes, demand readings,
       installations). The CCM will report the account
       number, the associated data base, and the age of
       the data. No data is deleted by this command; a
       PURGE command must be issued in order to delete the data.
    b. Allowed keyword and associated values
        DATE, TIME - all data that is older than this
        indicated date and time is reported to the UCC
    c. Addditional error codes
        60 - no data available.
12.                     PURGE - purge old information
    a. General description
        This command will cause all information in the
        Scheduled Reading Change, Installation, and Demand
        Reading data bases that is older than the
        specified date and time to be purged from the CCM
        memory.
    b. Allowed keywords and associated values
        DATE and TIME.
13. STATS - request memory statistics
14. DIAGNOSTICS - request diagnostics
15. Load - download software A summary of the command is as follows:
COMMANDS ORIGINATED BY UCC
1. Global Parameter Initialization
    UCC: PARAM PHONE=nnnnnnnnnnn TOD=f PR=f PRMODE=n
         WINDOWS=nn,nn,nn,nn,nn,nn CALLBACK=cccccc
         MODE=mmmmmm
2. Pre-load Installation Information
    UCC:  PREINSTALL ACCT=nnnnnnnnnnn PHONE=nnnnnnnnnnn
          MPHONE=nnnnnnnnnnn CALLIN=mm/dd/xy,hh:mm:ss
          CALLBACK=ccccc PREV=nnnnnn TOD=f PR=f PROMODE=n
          METER=f WINDOWS=nn,nn,nn,nn,nn,nn SERNO=nnnnnnnnnn
    CCM:  OK or REJECT
3. Load Installation Information
    UCC:  INSTALL ACCT=nnnnnnnn PHONE=nnnnnnnnnnn
          MPHONE=nnnnnnnnnnn CALLIN=mm/dd/yy,hh:mm:ss
          CALLBACK=cccccc PREV=nnnnnn TOD=f PR=f PRMODE=n
          SERNO=nnnnnnnnnn
    CCM:  Ok or REJECT
4. Load Encryption Keys
    UCC:  KEYS INDEX=NNN key=hh,hh,hh,hh
    CCM:  OK or REJECT
5. Load Scheduled Call Information
    UCC:  SCHEDULE ACCT=nnnnnnnn CALLIN=mm/dd/yy,hh:mm:ss
          CALLBACK=cccccc TOD =f PRMODE=n METER=f
          WINDOWS=nn,nn,nn,nn,nn,nn
    CCM:  OK or REJECT
6. Load Demand Call Information
    UCC:  DEMAND ACCT=nnnnnnnn CALLIN=mm/dd/yy,hh:mm:ss
          CALLBACK=cccccc TOD=f PR=f PRMOD=n METER=f
          WINDOWS=nn,nn,nn,nn,nn SERNO=nnnnnnnnn
    CCM:  OK or REJECT
7. Load Exemption Days
    UCC:  EXEMPTIONS YEAR=nnnn DAY=mm/dd DAY=mm/dd,mm/dd
    CCM:  OK or REJECT
8. Request AMR Call Data
    UCC:  DUMP
    CM:   REJECT
          or
          ACCT=nnnnnnnn mm/dd/yy hh:mm:ss
          MTIME=mm/dd/tt,hh:mm:ss NUMCALL=nn NUMQUERY=nn
          ALARMS=xxxxxxxxx,xxxxxxxxx, . . . READ=nnnnnn
          PREV=nnnnnn TOD=f PR=f METER=f
          TODDATA=nnnnnn,nnnnnn,nnnnnn
          PRDATA=nnnnnn,nnnnnn,nnnnnn OLDINEX=nn NEWINDEX=nn
          transaction-status
    UCC:
    Q or N
    CCM:  OK or REJECT or more data
    Repeat
9. Read CCM Time and Data
    UCC:  GETIME
    CCM:
    mm/d-
    d/yy,h-
    h:mm:ss
10. Set CCM Time and Date
    UCC:  SETTIME DATE=mm/dd/yy TIME=hh:mm:ss
11. Request Old Information Report
    UCC:  REQOLD DATE=mm/dd/yy TIME=hh:mm:ss
    CCM:
    REJECT
          or
    ACCT=nnnnnnnn DB=xx mm/dd/yy hh:mm:ss
    ACCT=nnnnnnnn DB=xx mm/dd/yy hh:mm:ss

```
    ACCT=nnnnnnnn DB=xx mm/dd/yy hh:mm:ss
    OK
12. Purge Old Information
    UCC:    PURGE DATE=mm/dd/yy TIME=hh:mm:ss
13. Request Memory Statistics
    UCC:    STATS
    CCM:    MASTER: nn%
            CCU1:   nn%
            CCU2:   nn%
            CCU3:   nn%
14. Request Diagnostics
    UCC:    DIATNOSTICS
    CCM:    REJECT
            or
            ERROR (nnnn) xxxxxxxxxxxxx
            ERROR (nnnn) xxxxxxxxxxxxx
               .
               .
               .
            ERROR (nnnn) xxxxxxxxxxxxx
            OK
15. Download Software
    UCC:    LOAD MASTER
            ... Intel Hex Records ...
            LOAD CCU
            ... Intel Hex Records ...
COMMANDS ORIGINATED BY CCM
    1.  Report Alarm Condition
        CCM:    ALARM
        UCC:    OK
        CCM:    ACCT=nnnnnnnn mm/dd/yy hh:m:ss
                MTIME=mm/dd/yy/hh:mm:ss NUMCALL=nn NUMQUERY=nn
                ALARMS=xxxxxxx,xxxxxxx, ...
                READ=nnnnnn PREV=nnnnnn TOD=f PR=f METER=f
                TODDATA=nnnnnn,nnnnnn,nnnnnn
                PRDATA=nnnnnn,nnnnnn,nnnnnn
                OLDINEX=nn      NEWINDEX=nn
                transaction-status
    2.  Report CCM Failure
        CCM:    CCMFAIL xxxxxxxxxxxxxxxxxxxxxxxxxxxxx
```

Operation of the Call Collection Module 12

The CCM 12 operates to respond to various UCC 40 commands as listed above and to send commands to report alarm and failures, as indicated. It also performs a very important function in communicating with the AMR. Such AMR-CCM communications include installation, demand read, scheduled report, emergency report and brainwash transactions which are summarized as follows:

| Installation Transaction | |
|---|---|
| CCM to AMR | AMR to CCM |
| TOD on/off, PR on/off, meter on/off (1 byte) customer account (4 bytes) AMR serial number (15 bytes) date of inti. (3 bytes) utility phone #(6 bytes) init. prev. meter (3 bytes) CCM bookkeeping data (7 bytes) current time (3 bytes) next call-in time (4 bytes) recall day (1 byte) TOD/PR exemption schedule (8 bytes) TOD/PR windows (3 bytes) PR window width (1 byte) BOTH HANG UP | ACK |

| Demand Reading Transaction | |
|---|---|
| CCM to AMR | AMR to CCM |
| transaction i.d. 80H (1 byte) AMR serial number (5 bytes) | ACK account number (4 bytes) CCM bookkeeping data (7 bytes) leak, low bat., freeze, tamper,TOD on/off (1 byte) current meter reading (3 bytes) previous meter reading (3 bytes) TOD data (9 bytes) PR data (6 bytes)-ACK CCM bookkeeping data (7 bytes) next call-in-time (4 bytes) new TOD/PR window flag, TOD on/off, PR on/off, meter on/off (1 byte) ACK BOTH HANG UP |

| Scheduled Report Transaction | |
|---|---|
| CCM to AMR | AMR to CCM |
| | transaction i.d. 80H |
| (1 byte) account number (4 bytes) CCM bookkeeping data (7 bytes) leak, low bat., freeze, tamper,TOD on/off, | |
| | PR on/off, meter on/off (1 byte) current meter reading (3 bytes) |

|  | -continued |
| --- | --- |
|  | previous meter reading (3 bytes) |
|  | TOD data (9 bytes) |
|  | PR data (6 bytes) |
| ACK |  |
| CCM bookkeeping data (7 bytes) |  |
| next call-in time (4 bytes) |  |
| new TOD/PR window 1 flag, |  |
| TOD on/off, PR on/off, |  |
| meter on/off (1 byte) |  |
|  | ACK |
| BOTH HANG UP |  |

| Emergency Report Transaction | |
| --- | --- |
| CCM to AMR | AMR to CCM |
|  | transaction i.d 40H (1 byte) |
|  | CCM bookkeeping data (7 bytes) |
|  | leak, low bat., freeze, ramper,TOD on/off PR on/off, meter on/off (1 byte) |
|  | current meter reading (3 bytes) |
|  | previous meter reading (3 bytes) |
|  | TOD data (9 bytes) |
|  | PR data (6 bytes) |
| ACK |  |
| CCM bookkeeping data (7 bytes) |  |
| next call-in time (4 bytes) |  |
| new TOD/PR window, flag, |  |
| TOD on/off, PR on/off, |  |
| meter on/off (1 byte) |  |
| ACK |  |
| BOTH HANG UP |  |

To handle such communications with the UCC 11 and the AMR's 15, the CCM 12 of the illustrated embodiment may use, for example, the mSBC 86/35 single board computer in the call collector units 256-258 and in the master central processing unit 260, connected through an Intel Corporation "MULTIBUS" system and using a PL/M 86 language developed by Intel Corporation which is a specific, block structured language. An example of a program is contained in a listing of Table III of the specification of the aforesaid U.S. application Ser. No. 876,896 filed June 20, 1986 and another example is in the microfiche Appendix to this specification. The mode of operation is illustrated in the block structure or tasking model charts of FIGS. 28 and 29.

Figure 28:
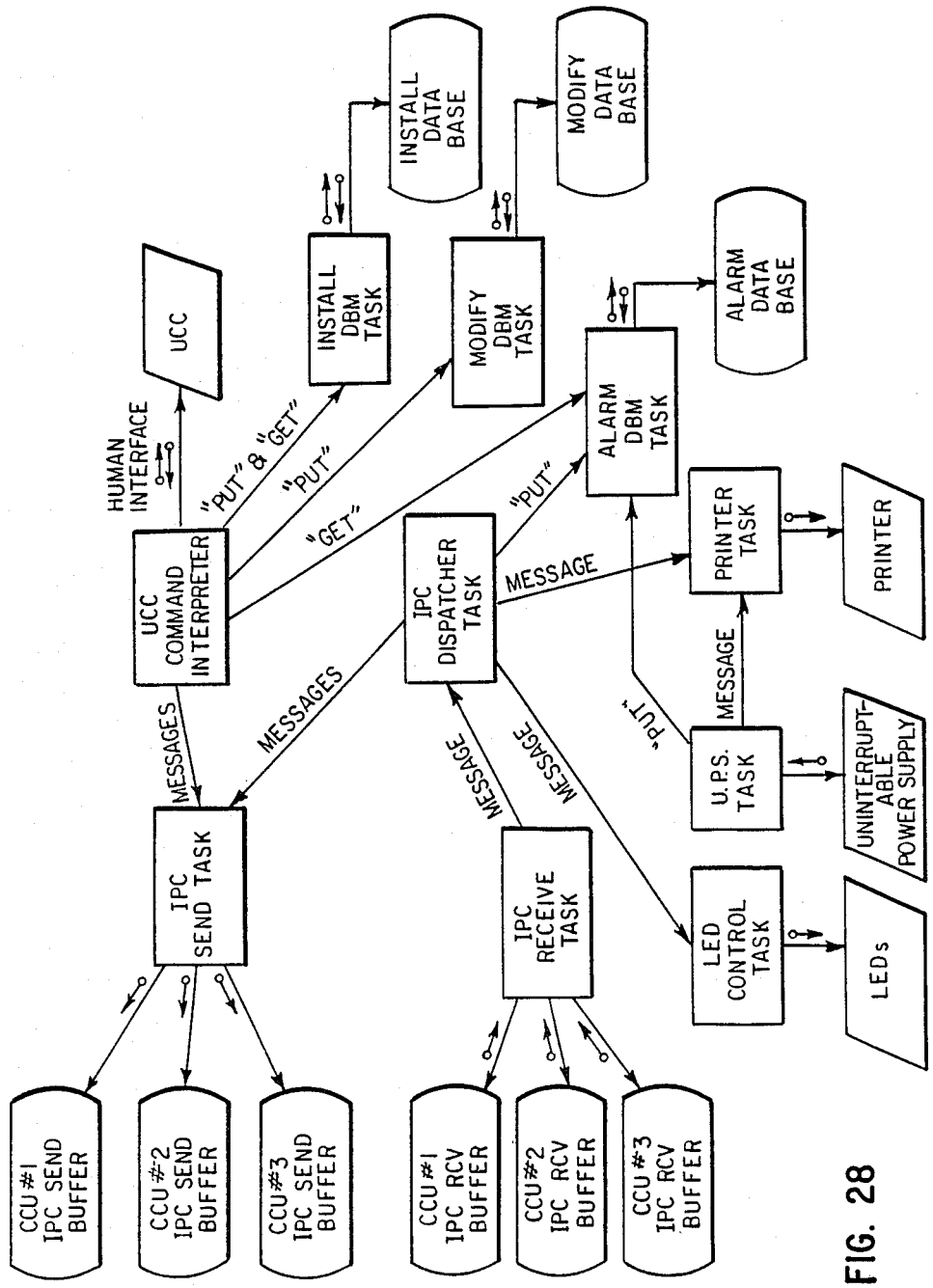
FIG. 28 is a structure chart or tasking model of a master central processing unit of the call collection module shown in FIG. 21.

Commands from the UCC 11 are handled by a UCC command interpreter of the system of the master CPU 260 shown in FIG. 28. The command interpreter sends messages to an Install DBM (Data Base Management) task, a Modify DBM task and an alarm DBM task and also to an IPC (Inter-Processor Control) task which effects communications with the CCU's 256-258 through buffers which are respectively identified as; "CCU #1 IPC Send Buffer", "CCU #2 IPC Send Buffer" and "CCU #3 IPC Send Buffer" in FIG. 28. The system of the master CPU 260 also includes an IPC Dispatcher task which receives messages through an IPC Receive Task and through receive buffers for the three CCU's 256-258 and which sends messages through a LED control task, a U.P.S. task, a Printer task and the Alarm DBM task.

Figure 29:
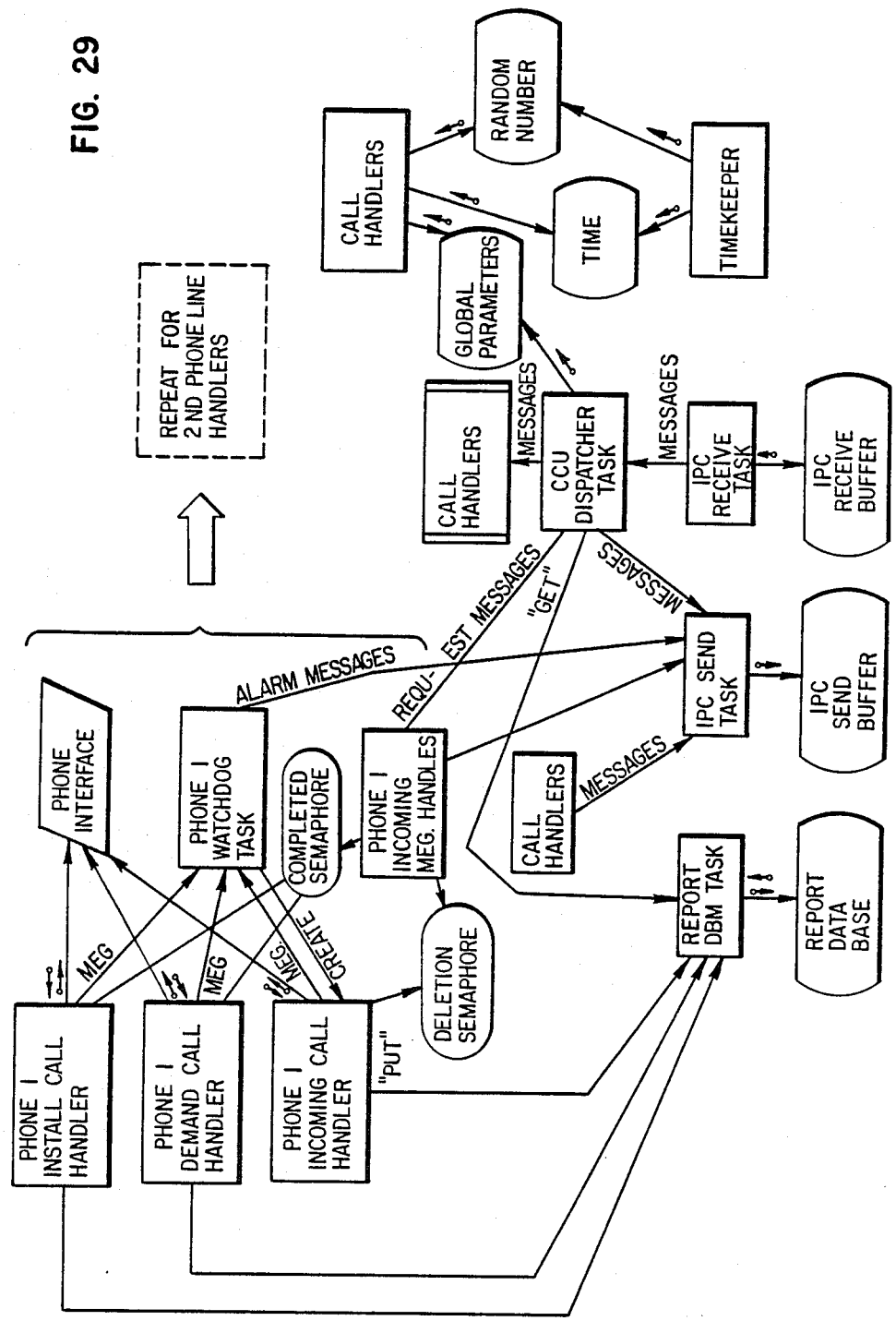
FIG. 29 is a structure flow chart or tasking model for one of three call collection units of the call collection module of FIG. 21.

The tasking model of one of the CCU's 256-258 is shown in FIG. 29. Two telephone lines are connected to each CCU through an interface and each line has an associated Install Call Handler, Demand Call Handler and Incoming Call Handler which "PUT" or send data received from an AMR to a Report Data Base, operating through a Report DBM (Data Base Management) task. Such call handlers may also send messages received from an AMR to an IPC Send Buffer to an IPC Send task, either directly or indirectly through a Watchdog task.

A CCU Dispatcher task receives messages from an IPC Receive Buffer through an IPC Receive task and sends messages to the three call handlers and an Incoming Message Handler for each of the two telephone lines and also to the Report DBM task, the IPC Send task and a Global Parameter base from which the call handlers may obtain data. As also indicated, provision is made for sending time and random number data through the call handlers.

In essence, the system permits operation through the UCC 11 to install and modify a control data base in the memory of the CCM 12, data from that base being ready for transmission from the CCM 12 to an AMR 15 when, for example, an AMR 15 makes a scheduled report. The meter data received by the CM 12 during a scheduled or other report is stored in a report data base in the RAM memory of the CCM 12, for transmission to the UCC 11 in response to "DUMP" and "N" commands sent from the UCC 11 to the command interpreter of the master CPU 260, shown in FIG. 28.

The CCM 12 also performs data processing operations which allow the data sent from and to AMRs 15 to be in a compressed format, minimizing the duration of transmissions of control and meter data to and from AMRs 15.

Since ordinary voice communication lines are used, it is desirable to use a relatively low baud rate. The illustrated system operates with FSK transmissions at 300 baud and with a standard asynchronous serial format with 8 data bits, one parity bit (even) and one stop bit. In the illustrated system, what may be described as a "PACKED BCD" format is used in transmission of numerical digits from 0 through 9, a 4 bit nibble being used for transmission of each digit. For communications between the CCM and the UCC, the standard ASCII code is used and the required translations are performed in the CCM.

The CCM 12 is also operative to make all required translations between the command formats listed above and the transmission of corresponding data to the AMRs 15 in formats such that the AMR may operate with a minimum amount of RAM and ROM and also a minimum amount of circuitry. The CCM 12 uses high speed processing circuitry and is very fast and efficient in handling all of its functions. Its cost is, of course, very much greater than that of an AMR. However, since its cost is in effect shared by all of the AMRs which may run into the tens of thousands and since the cost of each AMR is reduced, there is a very substantial overall reduction in the cost to the utility and its customers.

A further advantage of the arrangement using the CCM 12 such as disclosed is that it provides a great deal of flexibility with respect to changing modes of operation if required. The operating program for the CCM may be loaded from a disc storage and with an uninterruptable power supply, a high degree of reliability is obtained, with assurance against loss of meter data. It should also be noted that in normal operations, the meter data need only be temporarily stored in the memory of the CCM and with frequent transfers to the UCC, the meter data can be safely stored on the disc, with disc or tape back-ups being made, if desired.

Referring to FIG. 30, reference numeral 280 generally designates a modified AMR in which low power consumption circuitry 281 is provided which may include or be in the form of a gate array integrated circuit, as indicated and which includes clock, wake-up timer, meter pulse counter, status register, and reset and power control circuitry corresponding to the circuits 40, 41, 43, 46 and 50 of the AMR 15 of FIGS. 2–12. The AMR 280 also includes higher power consumption circuitry 282 which may be in the form of or include very large scale integrated circuitry, as indicated, and which includes telephone interface and power supply circuits, a modem, a dial tone detect circuit, a low battery detect circuit, and a microprocessor with RAM and serial I/O, a program memory ROM and I/O decode circuit. A non-volatile memory may be included, as is indicated, or it may be provided in a separate circuit. The circuit 282 is connected to tip and ring terminals 283 and 284 and separate crystals 285 and 286 are provided for the operation of the clock circuitry of circuitry 281 and for operation of the microprocessing circuitry serial I/O modem circuitry of circuit 282.

The arrangement of FIG. 30 has the advantage of a substantial reduction of cost and manufacture, in large volumes, and greater reliability as a result of fewer circuit interconnections. The use of separate crystals 285 and 286 has an advantage which is independent of other advantages in that the crystal 285 may be a relatively low frequency crystal such as a 32 KHz, for example, reducing the number of count-down stages in the clock circuitry and thereby reducing power consumption. At the same time, the crystal 286 may be a very high frequency crystal, operative at a frequency of on the order of 11–12 MHz, to permit very fast processing operations and to reduce the "on" time of the processor and thereby reduce average power consumption.

FIG. 31 corresponds to the right-hand portion of the flow chart of FIG. 14 and shows a modified operation. After a time-out of the wake-up timer 41 and after checking to see if it is time for a scheduled report, a test is made to determine whether a "off" bit is set, this bit being a bit in RAM which may set from the UCC 11 through the CCM 12 when, for example, service to a customer has been discontinued while the AMR 15 remains connected and operative, awaiting resumption of service to the same customer or start of service to a new customer at the same premises. If the "off" bit is set and a meter count greater than zero is detected, a special report call is initiated to report the condition.

As also shown in FIG. 31, a test may be made to detect whether a malfunction flag is set and, if so, the special report is initiated to report that condition as well as provide other status information. The malfunction flag may be set in response to conditions such as a freeze condition, a tilt condition of the AMR unit, detectable through a suitable switch which may be connected to an additional input of the status register buffer 194.

The malfunction flag may, of course, be set in response to other conditions. FIG. 32 shows an arrangement for detecting one type of malfunction which could present problems, especially in arrangements in which a metering switch is at a distance from an AMR or is otherwise so arranged that there is an exposed connecting wire which might be cut by a customer or which might accidentally become severed so as to be continuously opened or shorted so as to be continuously closed. As shown, a resistor 290 is connected in series with a meter switch 291 and a second resistor 292 is connected in parallel with the series combination of resistor 290 and switch 291. The combination of resistors 290 and 292 and the switch 291 is connected through lead wires 293 and 294 to terminals 295 and 296 of metering circuits of an AMR which includes comparator and de-bounce circuitry 298 supplied with an operating voltage from an output terminal 299 of a strobe circuit 300. Terminal 299 is connected through a resistor 301 to the terminal 295. The comparator and de-bounce circuit 298 has an output terminal 303 which may be connected to a meter pulse accumulator counter and an output terminal 304 which provides a malfunction output indication and which may be connected to a buffer stage of a status register. The strobe circuit 300 operates periodically to briefly apply an operating voltage at terminal 299 so as to develop a certain voltage at terminal 295 which is dependent upon the condition of the switch 291 and the connecting wires 293 and 294. At the same time, comparator circuitry is operated. If the switch 291 is operating properly, certain voltages will be developed at the input of the circuit 298 dependent upon the condition of the switch 291. If, however, the wires 293 and 294 are shorted together, a lower resistance is developed at all times or, if one of the other of the connecting wires 293 or 294 is open, a higher than normal voltage will be developed at the input of the circuit 298. In either case, circuit 298 develops a malfunction indication at the terminal 304. Circuitry 298 also responds to normal closures of the switch 291 to develop debounced output pulses at the terminal 303 for application to a meter pulse accumulator counter. This circuit arrangement minimizes power consumption.

Figure 33:
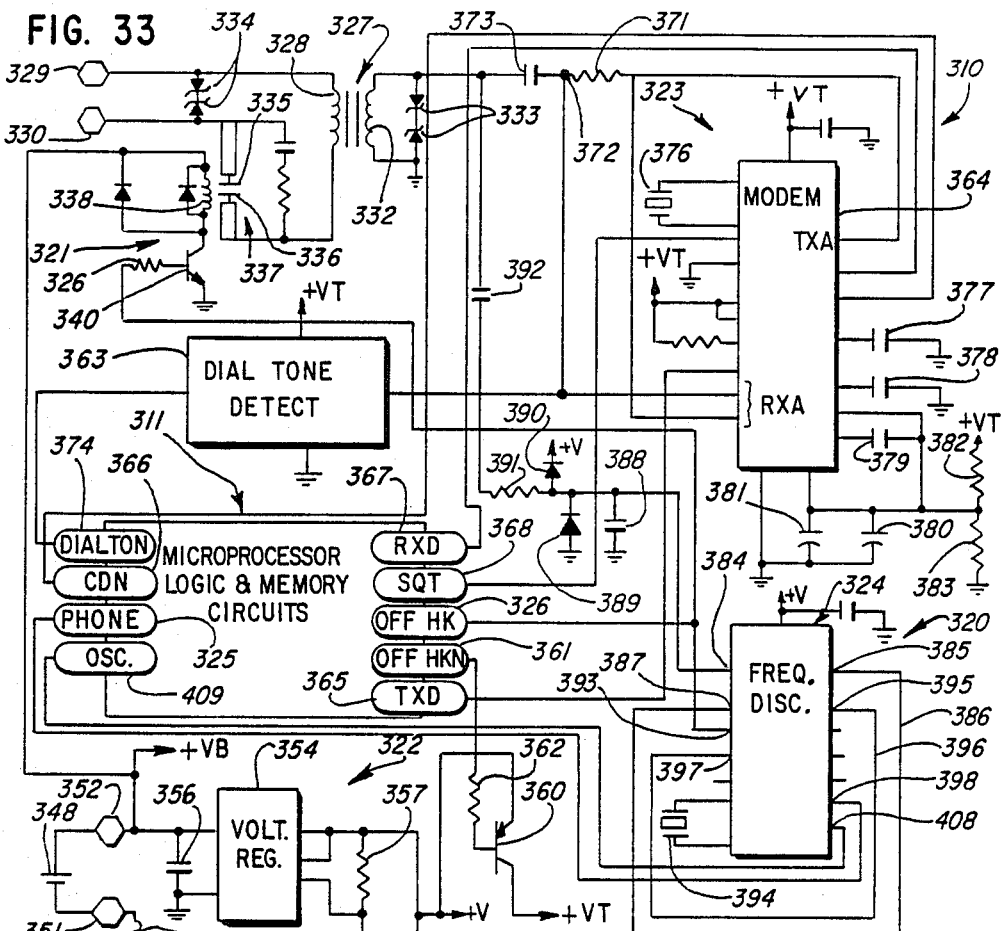
FIG. 33 a schematic diagram of circuitry of another preferred embodiment of AMR constructed in accordance with the principles of the invention.

Referring to FIG. 33, reference numeral 310 generally designates another preferred embodiment of an automatic meter reader or "AMR" constructed in accordance with the principles of the invention. The AMR 310 comprises circuitry which is shown as block 311 in FIG. 33 and which, as shown in more detail in FIG. 35, includes a microprocessor 312, logic circuits 314, a program memory 315, a non-volatile memory 316, a pre-settable counter 317, a binary counter 318 and a low battery detector circuit 319. As described herinafter in connection with FIG. 35, the logic circuits 314 may be in the form of a gate array, embodying a number of the circuits of the AMR 15 as shown in FIGS. 2–12 to produce the same general mode of operation.

Figure 34:
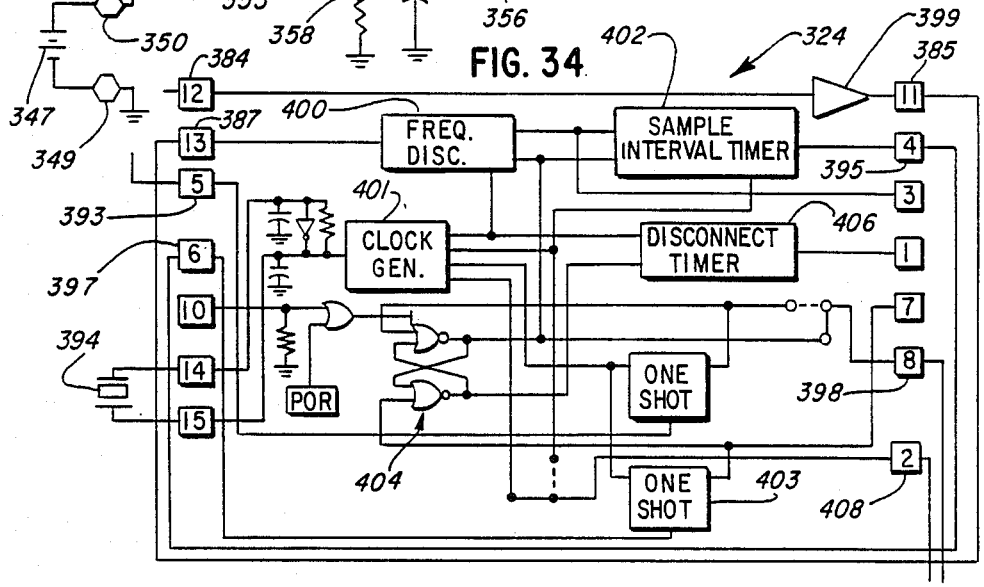
FIG. 34 is a schematic diagram of a frequency discriminator of a detector circuit shown in FIG. 33.
Figure 35:
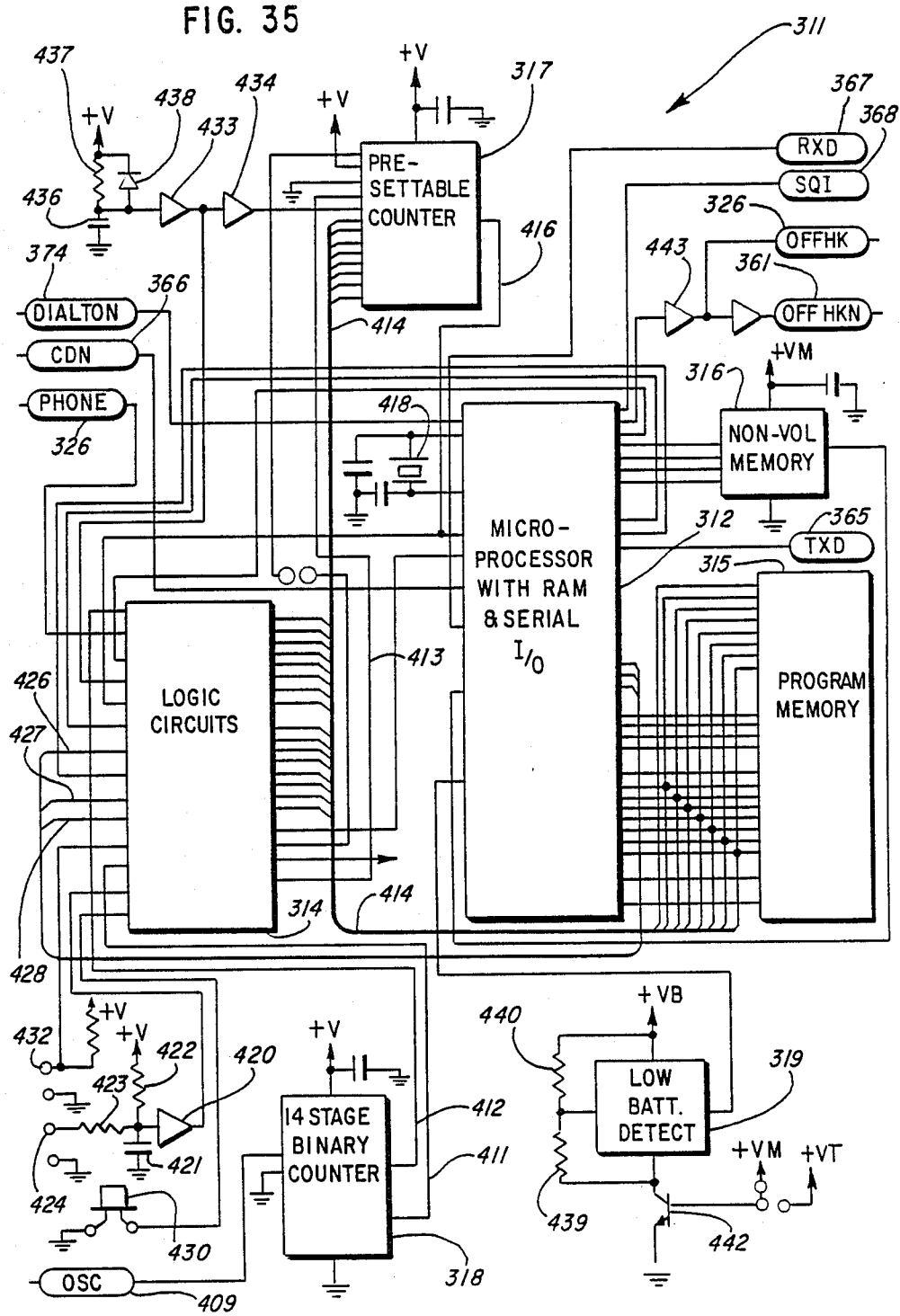
FIG. 35 is a schematic diagram of circuitry of the embodiment of FIG. 33, including a microprocessor, logic and memory circuits thereof.

The AMR 310 of FIGS. 33–35 is similar to the AMR 280 of FIG. 30 in that circuits 314 are incorporated in an electronically programmable logic device or "EPLD", similar to a gate array. However, it differs therefrom as well as from the AMR 15 of the embodiment of FIGS. 2–12 in the inclusion of a demand signal detector circuit 320, and in use of modified ciruits including a telephone interface circuit 321, a power supply circuit 322 and a modem circuit 323. With the circuit 320 and the combination thereof with the modified ciruits 321–323 a number of advantages are obtained, including reduced power consumption, simplicity, reliability, protection against transient voltage spikes on the telephone line and avoidance of interference with a subscriber's use of his telephone line.

The demand signal detector circuit 320 is operative at all times but has extremely low current consumption. It includes a frequency discriminator circuit 324 which is coupled to the telephone line to detect a demand signal of a certain form, for example, a tone burst having a frequency of 2800 Hz and a duration of 4.5 seconds. Such a signal may be sent from the CCM 12 to initiate a demand call sequence, as when initially setting up a AMR or when changing the service at a particular location from one customer to another. When the demand signal is detected, the circuit 324 develops a signal on a "PHONE" terminal 325 which is connected to power control circuitry to initiate a microprocessor power-up operation. The interface circuit 321 is then supplied with an off-hook signal at "OFFHK" terminal 326 to operate hook switch circuitry thereof and to connect the modem circuit 323 to the telephone line. The operation thereafter is similar to that of the AMR 15 as above-described, the modem circuit 323 being controlled to establish communcations with the CCM and to transmit and receive data.

The interface circuit 321 does not provide direct coupling between the line and the modem circuit 323 but uses an isolation transformer 327 of a standard type having a primary winding 328 coupled to telephone line terminals 329 and 330 and having a secondary winding 332 coupled to the demand signal detecting circuit 320 and modem circuit 323. A pair of voltage protection diodes 333 are connected across the secondary winding 332 and another pair of voltage protection diodes 334 are connected between the telephone line terminals 329 and 330. Terminal 329 is connected directly to one end of the primary winding 328 and terminal 330 is connectable to the other end of the primary winding 328 through contacts 335 and 336 of a hook relay 337. A coil 338 of relay 337 is connected between a battery terminal, indicated as "+VB", and the collector of a transistor 340 which has an emitter connected to ground and a base connected through a resistor 341 to the "OFFHK" terminal 326. When the processor circuitry applies a positive voltage to terminal 326, the transistor conducts to energize the relay 337 and connect the primary winding 328 of transformer 327 to the telephone line terminals 329 and 330, thereby effecting a change from an "on-hook" condition to an "off-hook" condition in which the modem circuit is coupled to the telephone line but with DC isolation and with the voltage protection provided by the two pairs of diodes 333 and 334.

The demand signal detector circuit 320 draws no current from the telephone line but an AC coupling is provided for detection of a demand signal burst or bursts in the on-hook condition of the relay 337. In the illustrated circuit, the detector circuit 320 is coupled to the transformer secondary winding and a capacitor 343 is connected in series with a resistor 344 between the line terminal 330 and primary winding 328, across the relay contacts 335 and 336. It is found that this arrangement provides suffcient coupling of the AC demand signal while providing DC isolation and while obtaining the protection of diodes 333 for the detector circuit 320 as well as the modem circuit 323.

The power supply 322 is operated by two batteries 347 and 348 in series, and comprises terminals 349 and 350 for connection to the negative and positive terminals of battery 347 and terminals 351 and 352 for connection to the negative and positive terminals of battery 348, terminal 349 being grounded and a fuse link 353 being connected between terminals 350 and 351. Terminal 352 forms the aforementioned "+VB" terminal and is connected to an input terminal of a voltage regulator circuit 354, also through a capacitor 355 to ground. An output teminal of the circuit 354 forms a "+V" voltage supply terminal for supplying voltages for the frequency discriminator circuit 324 and for meter pulse registering and memory circuits, as hereinafter described. A capacitor 356 and also a pair of series resistors 357 and 358 are connected between the "+V" terminal and ground, the resistors forming a voltage divider to supply a feedback voltage to a voltage sense input of the regulator 354.

The "+V" voltage is applied to the emitter of a transistor 360 and a "+VT" voltage is developed at the collector of the transistor 360 when an "OFFHKN" signal voltage at a terminal 361 is brought low, terminal 361 being connected through a resistor 362 to the base of the transistor 360. The "+VT" voltage is applied to the modem circuit 323 and to a dial tone detect circuit 363 in the off-hook condition.

The modem circuit 323 is similar to the modem circuit 30 of FIG. 4. It includes a standard integrated circuit 364 which has pins connected to a "TXD" terminal 365, a "CDN" terminal 366, a "RXD" terminal 367 and a "SQT" terminal 368. A voltage supply pin is connected to the "+V" terminal and through a capacitor 370 to ground. A "TXA" pin is connected to a "RXA" pin and is also connected through a resistor 371 to a circuit point 372 which is connected through a capacitor 373 to the secondary winding 332 of the isolation transformer 327. Circuit point 372 is also connected to a second "RXA" pin of circuit 364 and to the input of the dial tone detect circuit 363 which, after a dialing operation, may apply an output signal at a "DIALTON" terminal 374. Additional pins of the integrated circuit 364 are connected to a crystal 376 and to capacitors 377-381 and resistors 382 and 383 as shown which have values such as to obtain optimum operation, especially with respect to attack/release times.

In the demand signal detector circuit 320, the frequency discriminator circuit 324 includes a built-in amplifier section for receiving a low level sinusoidal input tone signal at a pin 384 and developing an amplified digital tone signal at a pin 385 which is connected through a line 386 to a pin 387 connected to a digital tone input of a frequency discriminator section of the circuit. The input of the amplifier section is connected through a capacitor 388 and a diode 389 to ground, through a diode 390 to "+V" and through a resistor 391 and a capacitor 392 to the secondary winding 332 of the isolation transformer 327. Components 388-392 provide additional protection with respect to voltage spikes or the like on the telephone line. A reset input of the circuit is connected to the "OFFHK" terminal 326. Additional pins of the circuit 324 are connected to a crystal 394 which may have a frequency of 32.768 KHz, for example, and which is connected to an internal clock generator to develop timing signals for comparison with the input signal to determine whether it has a certain frequency and duration.

When a signal of a certain frequency and duration is received, e.g. 2800 Hz and 4.5 seconds, a positive pulse is developed at a pin 395 which is connected through a line 396 to a pin 397 to trigger a one-shot multivibrator within circuit 324 and to switch a latching circuit to a condition to develop a signal at a pin 398 which is connected to the "PHONE" teminal 325.

FIG. 34 is a schematic diagram of the frequency discriminator circuit 326, showing the connections to an amplifier 399, a frequency discriminator 400, clock generator 401, sample interval timer 402, one-shot 403 and latch circuitry 404. An additional one-shot 405 and a disconnect timer 406 are included in the circuit but are not used in the illustrated embodiment. It is noted that the clock generator develops a signal at the same frequency as that of the crystal 394 which is applied to an output pin 408 connected to a "OSC" terminal 409 as shown in FIG. 33, terminal 409 being connected to metering circuitry as shown in FIG. 35.

Referring to FIG. 35, the "OSC" terminal 409 is connected to the counter 318 which is a 14 stage binary counter and which performs functions similar to those performed by the counters 175 and 176 in the AMR 15 of FIGS. 2-12, developing signals which are applied through lines 411 and 412 to logic circuitry 314. In response, the logic circuits develop a 0.5 Hz signal, applied through a line 413 to the pre-settable counter 317 which performs the functions of counters 179 and 180 in the AMR 15, the counter 317 being controlled by the microprocessor 312 through an eight line data bus 414. The output of counter 317 is a time-out signal applied through a line 416 to the microprocessor 312 and to the logic circuits 314 to initiate a "wake-up" and a sequence of operations like those produced by the AMR 15.

It is noted that no counter corresponding to the counter 166 of the AMR 15 is required. A high frequency clock signal for operation of the microprocessor 312 is developed by a crystal 418 connected directly thereto and connected through capacitors to ground as shown.

As aforementioned, the logic circuits 314 may be in a EPLD or may be in a gate array and they perform a number of the functions which are performed by separate circuits in the AMR 15 as illustrated in FIGS. 2-12. Logic circuits 314 include a meter pulse counter like that of FIG. 8, having an input coupled to the output of a Schmitt trigger circuit 420 which has an input coupled through a capacitor 421 to ground, through a resistor 422 to +V and through a resistor 423 to a meter pulse input terminal 424. Buffers corresponding to buffers 190-192 are connected to the data bus 414 and are controlled by signals applied through lines 426-428 from the microprocessor 312.

The logic circuits further include a status register which is connected to a tilt switch 430 and to the "PHONE" terminal 326. The status register may also be connected to a terminal 432 to which another status signal may be applied, such as a freeze-detect signal or a tamper or malfunction signal other than the tilt signal developed by the switch 430. Attention is directed to FIG. 32, in this connection.

For an initial power-on reset conditioning operation, the AMR 310 includes triggering circuits 433 and 434, a capacitor 435, a resistor 436 and a diode 437 which are connected as shown and which correspond to components 217, 218 and 220-222 of the circuit shown in FIG. 10.

The AMR 310 further includes the low battery detect circuit 319 connected to resistors 439 and 440 and connected in series with a transistor 442 which is rendered conductive when a +VM voltage is applied, so as to be conductive at all times during operation of the AMR 310. Alternatively, a jumper may be positioned to render transistor 442 conductive only in response to the +VT voltage, to thereby perform the low battery test only during a call-in or during a demand call and to thereby reduce battery drain.

The microprocessor 312 is connected through a first inverter 443 to develop the "OFFHK" signal at terminal 326, a second inverter 444 being operative to develop the "OFFHKN" signal at terminal 361.

The AMR 310 has substantially the same operation as depicted by the flow charts of FIGS. 13-20 and as described in connection with the AMR 15. When a demand signal is detected by the detector 320, a signal is developed at the "PHONE" terminal 325 and a wake-up operation is initiated as depicted in FIG. 14, a "yes" being developed upon testing of a "phone" flag which is then cleared and an identification flag is then set, after which the time slicer operation is initiated with the relay 337 being operated to the off-hook condition in the phone handler opertion. A +VT voltage is then applied to the modem 364 and if a carrier tone is detected by the modem, followed by the appropriate security data from the CCM, communications are established for receiving and sending data.

For use with the AMR 320, each of the call collection units 256, 257 and 258 of the CCM 12 includes a tone generator for generating a demand signal of a form for detection by the detector 320, e.g. a 4.5 second burst at a frequency of 2800 Hz, such tone generators being illustrated diagrammatically in FIG. 22 and being indicated by reference numerals 446, 447 and 448. The CCM 12 may thus be used with either type of AMR.

As aforementioned, the AMR 310 has important advantages. Since the off-hook condition needs to be established only in response to a demand signal from the CCM, which occurs very infrequently in normal operations, or during scheduled reports at monthly or other regular intervals, it is possible to use battery power to energize the modem while keeping average battery current flow at a very low level. It is not necessary to use line voltage for operation of the modem and problems are avoided. Also, a high degree of isolation is obtained, insuring that the impedance in the on-hook condition is very high in compliance with FCC regulations and also protecting the circuitry against transient voltage spikes on the telephone line. The circuitry is also relatively simple both in construction and operation and a high degree of reliability is obtained.

With a demand signal in the form of a tone burst of a certain frequency and duration, adequate security is normally maintained since additional security checks are made after responding to a detected burst. However, demand signals of other forms may be used using variations in frequency or duration or both, for additional security or for other purposes.

It will be understood that modifications and variations may be effected without departing from the spirit and scope of the novel concepts of this invention.

What is claimed is:

1. A metering system comprising: a plurality of automatic meter readers each arranged for connection to both consumption metering means and a telephone line at the premises of a subscriber and for transmission of meter data to a utility control center means, each telephone line being also connectable to standard types of telephone equipment at said premises and operative to respond to a standard ringing signal generated by a telephone exchange to which the line is connected, each of said meter readers including a battery-operated power supply, data generating means for connection to said consumption metering means to generate meter data, data storage means for storing generated meter data, data communication means including means for transmitting stored meter data from said data storage means, hook switch means for connecting said data communication means to a telephone line, control means for controlling said data generating means and said data communication means and said hook switch means, said hook switch means being normally in a on-hook state to disconnect said data communication means from said telephone line and establish a high resistance on-hook condition and being operable by said control means to an off-hook state to connect said data communication means to said telephone line and establish a low resistance off-hook line condition, demand signal receiving means arranged to develop a control signal in response to a demand signal of a certain form which is distinctively different from that of said standard ring signal, coupling means for coupling said demand signal receiving means to said telephone line to develop said control signal in response to a signal of said certain form on said line, said control means and said demand signal receiving means being continuously energized from said battery-operated power supply but having a very low power consumption as compared to that of said data communication means, and means for applying said control signal to said control means, said control means being responsive to said control signal to operate said hook switch means to said off-hook condition, energize said data communication means from said battery-operated power supply and connect said data communication means to said telephone line for transmission of meter data through said telephone line to said utility control center, said hook switch means being thereby operated and said data communication means being thereby energized and operated in response to a demand signal of said certain form without being operated in response to standard ring signals to minimize interference with normal subscriber's use of a telephone line and to minimize drain on said battery-operated power supply, wherein said data generating means of each of said automatic meter readers includes low current-consumption counter means continuously energized from said battery-operated power supply for temporary accumulation of meter data, and wherein said control means includes processor means arranged to be periodically energized for short time intervals from said battery-operated power supply to effect storage in said data storage means of data temporarily accumulated by said counter means.

2. A metering system as defined in claim 1, wherein said demand signal includes an AC signal burst having a certain frequency and duration.

3. A metering system as defined in claim 2, wherein said coupling means comprises a capacitor operative to provide DC isolation between said demand signal receiving means and said telephone line and to present a very high DC resistance across said telephone line in said on-hook state of said hook switch means.

4. A metering system as defined in claim 2, wherein said demand signal receiving means comprises frequency discriminator and interval timer means for establishing the frequency and duration of burst required for development of said control signal, and a clock circuit operative to develop a clock signal of a substantially constant frequency to said frequency discriminator and interval timer means.

5. A metering system as defined in claim 1, wherein said control means operates through said processor means to control said operation of said hook switch means and said energization and operation of said data communication means.

6. A metering system as defined in claim 5, wherein said control means includes means responsive to said control signal of said certain form to effect immediate energization of said processor means thereof.

* * * * *

UNITED STATES PATENT AND TRADEMARK OFFICE
CERTIFICATE OF CORRECTION

PATENT NO. : 4,866,761               Page 1 of 3

DATED     : September 12, 1989

INVENTOR(S) : Raymond J. Thornborough, et al

It is certified that error appears in the above-identified patent and that said Letters Patent is hereby corrected as shown below:

Column 4, line 5 - "cells" should be --calls--

Column 4, line 49 - "needed" should be --need--

Column 9, line 27 - "have" should be --having--

Column 9, line 53 - "time" should be --timer--

Column 10, line 44 - after "43" insert --and--

Column 14, line 43 - "7x" should be --72--

Column 18, line 57 - "potential" should be --potentially--

Column 19, line 32 - "3" should be --13--

Column 19, line 36 - "accomodated" should be --accommodated--

Column 24, under B. Commands Originated by the UCC subparagraph b. line 5, "wheather" should be --whether--

Column 24, subparagraph b. line 6, "calcuations" should be --calculations--

UNITED STATES PATENT AND TRADEMARK OFFICE
CERTIFICATE OF CORRECTION

PATENT NO. : 4,866,761

DATED : September 12, 1989

INVENTOR(S) : Raymond J. Thornborough, et al

It is certified that error appears in the above-identified patent and that said Letters Patent is hereby corrected as shown below:

Column 24, under 2. PREINSTALL heading, subparagraph a. line 7, there should be a period (.) after "minimized"

Column 25, subparagraph b. line 5, - there should be period (.) after "command"

Column 27, under 7. EXEMPTIONS heading, subparagraph a. line 5, - "than" should be --then--

Column 27, under 10, subparagraph c. - "indalid" should be --invalid--

Column 29, under 11, subparagraph c. "addditional" should be --additional--

Column 29, under 15 - "Load" should be --LOAD--

Column 29, under 15 - "command" should be --commands--

Column 29, under 2 - "xy" should be --yy--

UNITED STATES PATENT AND TRADEMARK OFFICE
CERTIFICATE OF CORRECTION

PATENT NO. : 4,866,761

DATED : September 12, 1989

INVENTOR(S) : Raymond J. Thornborough, et al

It is certified that error appears in the above-identified patent and that said Letters Patent is hereby corrected as shown below:

Column 29, under 6 - after "SERNO=" there are only 9 small "n's", there should be 10

Column 29, under 9 - "Data" should be --Date--

Column 29, under 9 - setup on "CCM: mm/dd/yy,hh:mm:ss" is incorrect

Column 29, under 11 - setup on "CCM: REJECT" is incorrect

Column 31, under 2 - there are 28 "x's", application has 29

Column 34, line 21 - "CM" should be --CCM--

Signed and Sealed this

Tenth Day of September, 1991

*Attest:*

HARRY F. MANBECK, JR.

*Attesting Officer*  *Commissioner of Patents and Trademarks*